United States Patent
Chen et al.

(10) Patent No.: US 11,361,490 B2
(45) Date of Patent: Jun. 14, 2022

(54) ATTENTION GUIDANCE FOR GROUND CONTROL LABELING IN STREET VIEW IMAGERY

(71) Applicant: HERE Global B.V., Eindhoven (NL)

(72) Inventors: Zhanwei Chen, Eindhoven (NL); Nick Pojman, Oakland, CA (US); David Lawlor, Evanston, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 17/110,735

(22) Filed: Dec. 3, 2020

(65) Prior Publication Data
US 2022/0058844 A1    Feb. 24, 2022

Related U.S. Application Data

(60) Provisional application No. 63/066,875, filed on Aug. 18, 2020.

(51) Int. Cl.
*G06T 7/00* (2017.01)
*G06T 11/00* (2006.01)
(Continued)

(52) U.S. Cl.
CPC ............ *G06T 11/60* (2013.01); *G06F 3/0484* (2013.01); *G06T 7/70* (2017.01); *G06V 20/20* (2022.01);
(Continued)

(58) Field of Classification Search
CPC ......... G06T 11/60; G06T 7/70; G06F 3/0484; G06K 9/00671; G06K 9/00805;
(Continued)

(56) References Cited

U.S. PATENT DOCUMENTS

| | | |
|---|---|---|
| 5,864,632 A | 1/1999 | Ogawa et al. |
| 9,342,998 B2 | 5/2016 | Barnett et al. |

(Continued)

FOREIGN PATENT DOCUMENTS

| | | |
|---|---|---|
| CN | 110147701 A | 8/2019 |

OTHER PUBLICATIONS

"Creating A Correspondence in Scene" [online] [Retrieved Mar. 15, 2021], Retrieved from the Internet: <URL: https://knowledge.faro.com/Software/FARO_SCENE/SCENE/Creating_a_Correspondence_in_SCENE> (dated Jul. 6, 2018), 9 pages.

(Continued)

*Primary Examiner* — Jin Cheng Wang
(74) *Attorney, Agent, or Firm* — Alston & Bird LLP

(57) ABSTRACT

The disclosure provides methods, apparatus, and products for attention guidance and labeling. In one aspect, a method comprises receiving metadata associated with a perspective image captured by an image capture device located at the image position and having the image pose, wherein the metadata comprises the image position and the image pose. The method comprises defining a field-of-view indicator having a first indicator position located at the image position and having the image pose; receiving ground control point (GCP) information identifying a GCP, wherein the GCP information comprises a GCP position; defining a GCP indicator having a second indicator position located at the GCP position; and causing display of an indicator layer comprising the field-of-view indicator and the GCP indicator in a second portion of an interactive user interface (IUI) of a labeling tool, wherein at least the perspective image is displayed in a first portion of the IUI.

20 Claims, 13 Drawing Sheets

(51) Int. Cl.

| | | |
|---|---|---|
| *G06F 3/0484* | (2022.01) | |
| *G06T 11/60* | (2006.01) | |
| *G06T 7/70* | (2017.01) | |
| *G06V 20/58* | (2022.01) | |
| *G06V 20/20* | (2022.01) | |
| *G06V 20/56* | (2022.01) | |
| *G09G 5/00* | (2006.01) | |

(52) U.S. Cl.
CPC ............ *G06V 20/56* (2022.01); *G06V 20/582* (2022.01); *G06V 20/584* (2022.01); *G09G 5/00* (2013.01); *G06T 2207/10032* (2013.01)

(58) Field of Classification Search
CPC ........... G06K 9/00791; G06K 9/00818; G06K 9/00825; B60K 2370/166; B60K 2370/1529; B60K 2370/193; G08G 1/09623; G08G 1/167
See application file for complete search history.

(56) References Cited

U.S. PATENT DOCUMENTS

| | | | |
|---|---|---|---|
| 2016/0302895 | A1 | 10/2016 | Rohaly et al. |
| 2020/0167603 | A1* | 5/2020 | Ung ........................ G06V 20/56 |
| 2020/0211375 | A1* | 7/2020 | Vig .......................... G01S 13/89 |
| 2020/0406753 | A1* | 12/2020 | Hayashi ................... G09G 5/38 |

OTHER PUBLICATIONS

"How to Geo-Reference the Scene in Reality Capture Using Ground Control Points Faster" [online] [Retrieved Mar. 26, 2020], Retrieved from the Internet: <URL: https://support.capturingreality.com/hc/en-us/articles/360001577032-How-to-geo-reference-the-scene-in-RealityCapture-using-ground-control-points-faster>, (dated Mar. 10, 2020), 16 pages.

Tylecek et al., "Consistent Semantic Annotation of Outdoor Datasets via 2D/3D Label Transfer", Sensors vol. 18, 7 2249 (Jul. 12, 2018), 20 pages.

* cited by examiner

ATTENTION GUIDANCE FOR GROUND CONTROL LABELING IN STREET VIEW IMAGERY

CROSS-REFERENCE TO RELATED APPLICATIONS

This application claims priority to U.S. Application No. 63/066,875, filed Aug. 18, 2020, the content of which is incorporated herein by reference in its entirety.

TECHNOLOGICAL FIELD

An example embodiment relates generally to image alignment, labeling, and feature detection. In particular, example embodiments generally relate to providing indicator layers and indicator overlays as a visual aid in an interactive user interface (IUI) of a labeling tool to assist feature identification, data verification, and image alignment, among other various tasks.

BACKGROUND

With automated driving quickly becoming a reality, automated vehicles need to be able to perceive the world with an accurate semantic understanding in order to obey driving rules and avoid collisions. A critical part of enabling such understanding is the ability to create and interpret highly accurate and up-to-date maps. For example, path planning requires knowledge of what to expect beyond a vehicle's perceptual horizon, and driving in complicated urban environments with many occluding objects requires a knowledge of what cannot be seen. The creation of highly accurate and up-to-date maps require complex data processing and analysis tasks on captured sensor data that are usually performed manually by a user.

BRIEF SUMMARY

In creating an accurate and up-to-date map database, ground sources such as cars and robots are equipped with probe or sensing systems to acquire an accurate model of their environments. For example, a car may be fitted with a Global Positioning System (GPS), Inertial Measurement Unit (IMU), camera, and/or LIDAR sensor systems that can detect and capture visible map features and tag such features with additional positional data. The quality of the resulting map then depends on the accuracy of the associated positional data.

Ground control points (GCPs) are often used to assess the quality of the sensor data from these ground sources and may be referred to as "reference data". GCPs are also used to adjust positioning metadata of the ground sources themselves, thus acting as "control data". GCPs are defined as identifiable points on the Earth's surface or in the surrounding environment that have a precise, static location associated with them. For example, one might consider using (i) a specific point on a particular building, such as a corner of a specific window, (ii) a specific corner of the letter "T" on a stop sign, or (iii) a particular corner of a painted lane marking on a specific road, as a GCP, but a parked car would not be a viable GCP. To use the GCPs to assess ground source sensor data accuracy, a standard approach is to manually associate independently collected GCPs within the ground source sensor data and compare the detected position of the GCPs to their known ground truth positions. However, in many situations, the first step of identifying and labeling the GCPs in the ground source sensor data is a tedious, manual process that is prone to errors due to the complicated nature of some captured environments and the difficulty in discerning clear context, especially from a street-level view. For example, users may be tasked with identifying, selecting, and/or labeling pixels of a perspective image that correspond to a GCP.

Additionally, areas of interest are captured by ground sources multiple times and via multiple different approaches or routes in order to accumulate the amount of data needed for the requisite accuracy of the map database. When multiple sets of ground source sensor data exists for an area of interest, the area of interest and significant features within the area need to be recognized and aligned against so there is a single version of reality across the multiple sets of ground source sensor data. In other words, versions of the significant or identifiable features (possibly GCPs) present in multiple sets of ground source sensor data should only exist once in a final map database. This feature correspondence across data captures allows physical features to be observed at the same location in real space when viewed by different data captures each possibly having different ground source positions and poses. Again however, in many situations this feature correspondence and alignment is a tedious, manual process that is prone to errors due to the complicated nature of some captured environment and the difficulty in discerning clear context, especially from a street-level view. For example, users may be tasked with identifying, selecting, and/or labeling pixels of two perspective images that correspond to the same static feature.

Methods, apparatus and computer program products are provided in accordance with example embodiments in order to provide an indicator layer overlay in an interactive user interface (IUI) for a labeling tool. The example embodiments described herein provide a technical advantage by assisting a user in performing GCP identification/labeling and feature correspondence/image alignments tasks. In various embodiments, the indicator layer overlay provides an indication of position and pose (e.g., orientation, cardinality) of ground source sensor data in an over-head view or context. In general, the indication of position is representative of a precise location where the ground source sensor data, such a street-view image or a perspective image, was captured by a ground source, or probe apparatus. The indication of pose generally is representative of an approximate field-of-view of the perspective image. Further, multiple indications of position and pose corresponding to multiple perspective images may be displayed in the indicator layer overlay. The indicator layer overlay may also provide an indication of position of a ground control point (GCP). For example, the indicator layer overlay may receive and/or access ground truth information that provides an exact location for a GCP, where it may be assumed that the GCP location data is highly accurate and able to be used as control data. The indicator layer overlay then defines, creates, and/or generates an indicator at the position corresponding to the location of the GCP. Thus, the indicator layer overlay provides the GCP indicator along with the indications of position and pose of the perspective image(s), providing context for a user as to the positions and the poses of the data of interest.

In accordance with a first aspect of the present disclosure, a method is provided. The method comprises receiving, by a processor of a user apparatus, metadata associated with a perspective image captured by an image capture device located at an image position and having an image pose, wherein the metadata comprises the image position and the image pose; defining, by the user apparatus, a field-of-view indicator having a first indicator position located at the image position and having the image pose; receiving, by the processor of the user apparatus, ground control point (GCP) information identifying a GCP, wherein the GCP information comprises a GCP position based at least in part on a location of the GCP; defining, by the user apparatus, a GCP indicator having a second indicator position located at the GCP position; and causing, by the user apparatus, display of an indicator layer comprising the field-of-view indicator and the GCP indicator in a second portion of an interactive user interface (IUI) of a labeling tool, wherein at least the perspective image is displayed in a first portion of the IUI of the labeling tool and the labeling tool is provided via output circuitry of the user apparatus. In an example embodiment, the image position and the image pose are determined at least in part by a location sensor of a probe apparatus, the image capture device being coupled to the probe apparatus. The image position comprises a latitude, longitude, and elevation of the probe apparatus, and the image pose comprises an orientation of the probe apparatus.

In an example embodiment, the indicator layer comprising the field-of-view indicator and the GCP indicator is displayed overlaid on a digital map layer in the second portion of the IUI of the labeling tool, the digital map layer being one of a satellite layer, a two-dimensional model layer, or a three-dimensional model layer. In an example embodiment, the field-of-view indicator comprises a configurable representation of an approximate field-of-view of the image capture device when the perspective image was captured. The field-of-view indicator comprises two lines extending from the first indicator position, the two lines defining a field-of-view angle that is oriented based at least in part on the image pose, the field-of-view angle representing the approximate field-of-view. In an example embodiment, the provided method further comprises providing an alert via the IUI of the labeling tool based at least in part on the GCP indicator being located within the approximate field-of-view.

In an example embodiment, the provided method further comprises receiving, by a processor of a user apparatus, metadata associated with a second perspective image, wherein the metadata associated with the second perspective image comprises a second image position and a second image pose; defining a second image indicator having a third indicator position located at the second image position; and causing display of the second image indicator in the second portion of the IUI of the labeling tool. The method then further comprises defining a second field-of-view indicator having the third indicator position located at the second image position and having the second image pose; defining a first image indicator having the first indicator position located at the first image position; and responsive to user interaction with input circuitry of the user apparatus, causing display of a second indicator layer comprising the second field-of-view indicator, the first image indicator, and the GCP indicator via the second portion of the IUI of the labeling tool.

In an example embodiment, the GCP is an identifiable, static feature located within a predetermined distance from the image position. In an example embodiment, the GCP is at least partially visible in the perspective image. In an example embodiment, the GCP position is a ground truth position. In an example embodiment, the GCP information further comprises a plurality of control images, the GCP being visible in each of the plurality of control images. In an example embodiment, the provided method further causes display of the plurality of control images in the first portion of the UI of the labeling tool.

According to another aspect of the present disclosure, an apparatus comprising at least one processor and at least one memory storing computer program code is provided. The at least one memory and the compute program code are configured to, with the processor, cause the apparatus to at least receive metadata associated with a perspective image captured by an image capture device located at the image position and having the image pose, wherein the metadata comprises the image position and the image pose; define a field-of-view indicator having a first indicator position located at the image position and having the image pose; receive ground control point (GCP) information identifying a GCP, wherein the GCP information comprises a GCP position based at least in part on a location of the GCP; define a GCP indicator having a second indicator position located at the GCP position; and cause display of an indicator layer comprising the field-of-view indicator and the GCP indicator in a second portion of an interactive user interface (IUI) of a labeling tool, wherein at least the perspective image is displayed in a first portion of the IUI of the labeling tool and the labeling tool is provided via output circuitry.

In an example embodiment, the indicator layer comprising the field-of-view indicator and the GCP indicator is displayed overlaid on a digital map layer in the second portion of the IUI of the labeling tool, the digital map layer being one of a satellite layer, a two-dimensional model layer, or a three-dimensional model layer. The field-of-view indicator comprises a configurable representation of an approximate field-of-view of the image capture device when the perspective image was captured. In an example embodiment, the GCP is an identifiable, static feature located within a predetermined distance from the image position.

In an example embodiment, the provided apparatus is further caused to receive metadata associated with a second perspective image, wherein the metadata associated with the second perspective image comprises a second image position and a second image pose; define a second image indicator having a third indicator position located at the second image position; and cause display of the second image indicator in the second portion of the IUI of the labeling tool. The apparatus is then further caused to define a second field-of-view indicator having the third indicator position located at the second image position and having the second image pose; define a first image indicator having the first indicator position located at the first image position; and cause display of a second indicator layer comprising the second field-of-view indicator, the first image indicator, and the GCP indicator via the second portion of the IUI of the labeling tool.

In accordance with another example embodiment, a computer program product is provided that comprises at least one non-transitory computer-readable storage medium having computer-executable program code instructions stored therein. The computer-executable program code instructions comprise program code instructions configured to, when executed by a processor of an apparatus, cause the apparatus to receive metadata associated with a perspective image captured by an image capture device located at the image position and having the image pose, wherein the metadata comprises the image position and the image pose; define a field-of-view indicator having a first indicator position located at the image position and having the image pose; receive ground control point (GCP) information identifying a GCP, wherein the GCP information comprises a GCP position based at least in part on a location of the GCP; define a GCP indicator having a second indicator position located at the GCP position; and cause display of an indicator layer comprising the field-of-view indicator and the GCP indicator in a second portion of an interactive user interface (IUI) of a labeling tool, wherein at least the perspective image is displayed in a first portion of the IUI of the labeling tool and the labeling tool is provided via output circuitry.

In accordance with yet another aspect of the present disclosure, an apparatus is provided that comprises means for receiving metadata associated with a perspective image captured by an image capture device located at the image position and having the image pose, wherein the metadata comprises the image position and the image pose. The apparatus comprises means for defining a field-of-view indicator having a first indicator position located at the image position and having the image pose. The apparatus comprises means for receiving ground control point (GCP) information identifying a GCP, wherein the GCP information comprises a GCP position based at least in part on a location of the GCP. The apparatus comprises means for defining a GCP indicator having a second indicator position located at the GCP position. The apparatus comprises means for causing display of an indicator layer comprising the field-of-view indicator and the GCP indicator in a second portion of an interactive user interface (IUI) of a labeling tool, wherein at least the perspective image is displayed in a first portion of the IUI of the labeling tool and means for providing the labeling tool.

According to yet another aspect of the present disclosure, another method is provided. The method comprises receiving, by a processor of a user apparatus, metadata associated with a first perspective image captured by a first image captured device located at a first image position and having a first image pose, wherein the metadata comprises the first image position and the first image pose; defining, by the user apparatus, a first field-of-view indicator having a first indicator position located at the first image position and having the first image pose; receiving, by the processor of the user apparatus, metadata associated with a second perspective image captured by a second image capture device located at a second image position and having a second image pose, wherein the metadata associated with a second perspective image comprises the second image position and the second image pose; defining, by the user apparatus, a second field-of-view indicator having a second indicator position located at the second image position and having the second image pose; and causing, by the user apparatus, display of an indicator layer comprising the first field-of-view indicator and the second field-of-view indicator in a second portion of an interactive user interface (IUI) of a labeling tool, wherein at least one of the first perspective image or the second perspective image is displayed in a first portion of the IUI of the labeling tool and the labeling tool is provided via output circuitry of the user apparatus.

In an example embodiment, the indicator layer comprising the first and second field-of-view indicators is displayed overlaid on a digital map layer in the second portion of the IUI of the labeling tool, the digital map layer being one of a satellite layer, a two-dimensional model layer, or a three-dimensional model layer. In an example embodiment, the first field-of-view indicator comprises a configurable representation of an approximate field-of-view of the first image capture device when the first perspective image was captured, and the second field-of-view indicator comprises a configurable representation of an approximate field-of-view of the second image capture device when the second perspective image was captured. The first and second field-of-view indicators each comprise two lines extending from the first and second indicator position, respectively, each two lines defining field-of-view angles that are oriented based at least in part on the first and second image poses, the field-of-view angles representing the approximate field-of-views. In an example embodiment, the provided method further comprises providing an alert via the IUI of the labeling tool based at least in part on an overlap between at least one of the two lines of the first field-of-view indicator and at least one of the two lines of the second field-of-view indicator.

In an example embodiment, the first and second image positions and the first and second image poses are determined at least in part by a location sensor of a first and second probe apparatus, respectively, the first and second image capture device being respectively coupled to a corresponding one of the first or second probe apparatus. The first and second image positions each comprise a latitude, longitude, and elevation of the corresponding one of the first or second probe apparatus, and the first and second image poses each comprise an orientation of the corresponding one of the first or second probe apparatus.

In an example embodiment, the provided method further comprises receiving, by the processor of the user apparatus, metadata associated with a third perspective image, wherein the metadata associated with the third perspective image comprises a third image position and a third image pose; defining, by the user apparatus, a third field-of-view indicator having a third indicator position located at the second image position and having the third image pose; and causing display of the third field-of-view indicator in the second portion of the IUI of the labeling tool. In an example embodiment, the first image capture device and the second image capture device are the same image capture device, the first perspective image being captured by the same image capture device at a first time and the second perspective image being captured by the same image capture device at a second time. In an example embodiment, the first and second field-of-view indicators are configured to show a relationship between the first image position and first image pose and the second image position and second image pose.

According to yet another aspect of the present disclosure, another apparatus comprising at least one processor and at least one memory storing computer program code is provided. The at least one memory and the compute program code are configured to, with the processor, cause the apparatus to receive metadata associated with a first perspective image captured by a first image capture device located at a first image position and having a first image pose, wherein the metadata comprises the first image position and the first image pose; define a first field-of-view indicator having a first indicator position located at the first image position and having the first image pose; receive metadata associated with a second perspective image captured by a second image capture device located at a second image position and having a second image pose, wherein the metadata associated with the second perspective image comprises the second image position and the second image pose; define a second field-of-view indicator having a second indicator position located at the second image position and having the second image pose; and cause display of an indicator layer comprising the first field-of-view indicator and the second field-of-view indicator in a second portion of an interactive user interface (IUI) of a labeling tool, wherein at least one of the first perspective image or the second perspective image is displayed in a first portion of the IUI of the labeling tool and the labeling tool is provided via output circuitry.

In an example embodiment, the indicator layer comprising the first and second field-of-view indicators is displayed overlaid on a digital map layer in the second portion of the IUI of the labeling tool, the digital map layer being one of a satellite layer, a two-dimensional model layer, or a three-dimensional model layer. In an example embodiment, the first field-of-view indicator comprises a configurable representation of an approximate field-of-view of the first image capture device when the first perspective image was captured, and the second field-of-view indicator comprises a configurable representation of an approximate field-of-view of the second image capture device when the second perspective image was captured. The first and second field-of-view indicators each comprise two lines extending from the first and second indicator position, respectively, each two lines defining field-of-view angles that are oriented based at least in part on the first and second image poses, the field-of-view angles representing the approximate field-of-views. In an example embodiment, the provided apparatus is further caused to provide an alert via the IUI of the labeling tool based at least in part on an overlap between at least one of the two lines of the first field-of-view indicator and at least one of the two lines of the second field-of-view indicator. In an example embodiment, the first and second image positions and the first and second image poses are determined at least in part by a location sensor of a first and second probe apparatus, respectively, the first and second image capture device being respectively coupled to a corresponding one of the first or second probe apparatus.

In an example embodiment, the provided apparatus is further caused to receive metadata associated with a third perspective image, wherein the metadata associated with the third perspective image comprises a third image position and a third image pose; define a third field-of-view indicator having a third indicator position located at the second image position and having the third image pose; and cause display of the third field-of-view indicator in the second portion of the IUI of the labeling tool. In an example embodiment, the first image capture device and the second image capture device are the same image capture device, the first perspective image being captured by the same image capture device at a first time and the second perspective image being captured by the same image capture device at a second time. In an example embodiment, the first and second field-of-view indicators are configured to show a relationship between the first image position and first image pose and the second image position and second image pose.

According to another aspect of the present disclosure, another method is provided. The provided method comprises receiving, by a processor of a user apparatus, metadata associated with a plurality of perspective images, wherein the metadata comprises a plurality of image positions and a plurality of image poses, each of the plurality of perspective images corresponding to one of the plurality of image positions and one of the plurality of image poses; defining, by the user apparatus, a plurality of field-of-view indicators, each field-of-view indicator being associated with a corresponding perspective image of the plurality of perspective images, having the corresponding image position and the corresponding image pose, and providing an indication of a field-of-view of an image capture device that captured the corresponding perspective image; generating, by the user apparatus, an indicator layer comprising the plurality of field-of-view indicators; and causing, by the user apparatus, display of the indicator layer comprising the plurality of field-of-view indicators in a second portion of an interactive user interface (IUI) of a labeling tool, wherein the plurality of perspective images is displayed in a first portion of the IUI of the labeling tool and the labeling tool is provided via output circuitry of the user apparatus.

In an example embodiment, each of the plurality of perspective images are captured by a plurality of image capture devices, each image capture device having the corresponding image position and the corresponding image pose when capturing each perspective image. In another example embodiment, the plurality of perspective images is captured by an image capture device, the image capture device having the plurality of corresponding image positions and the plurality of corresponding image poses at different times.

BRIEF DESCRIPTION OF THE DRAWINGS

Figure 1:
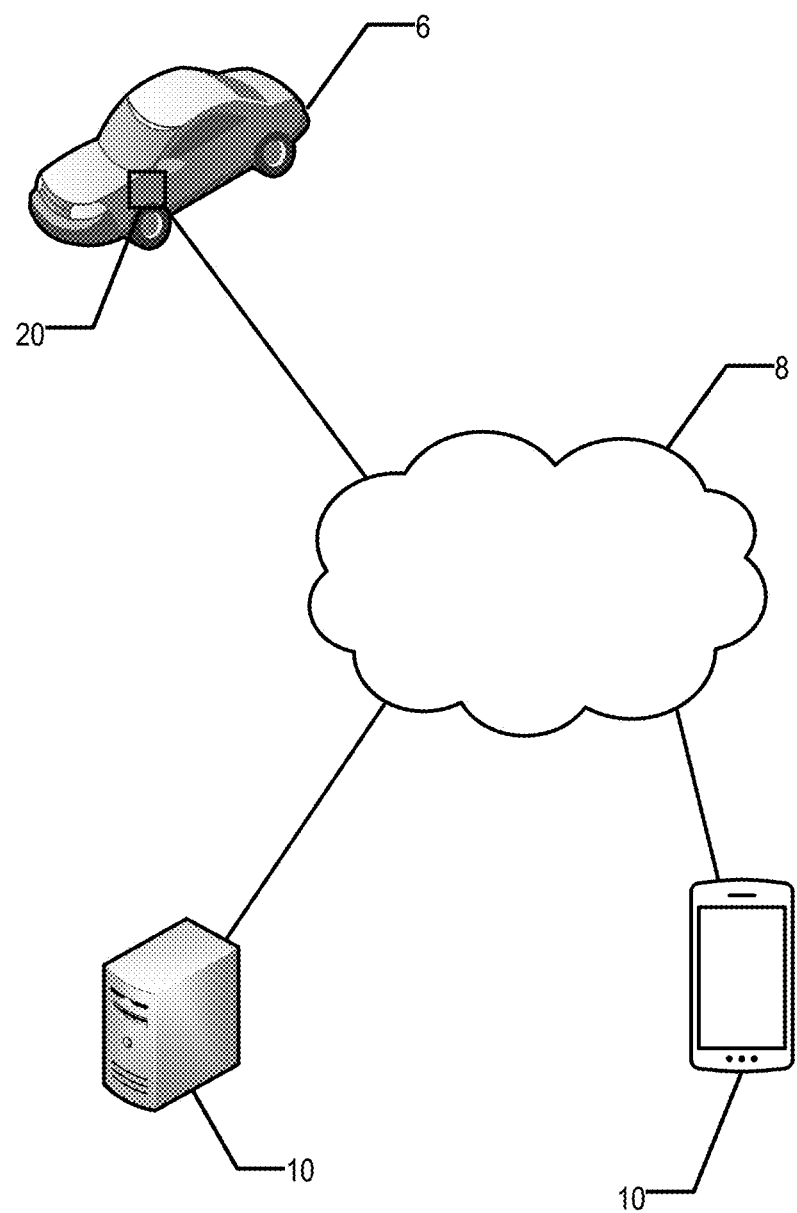
Figure 2A:
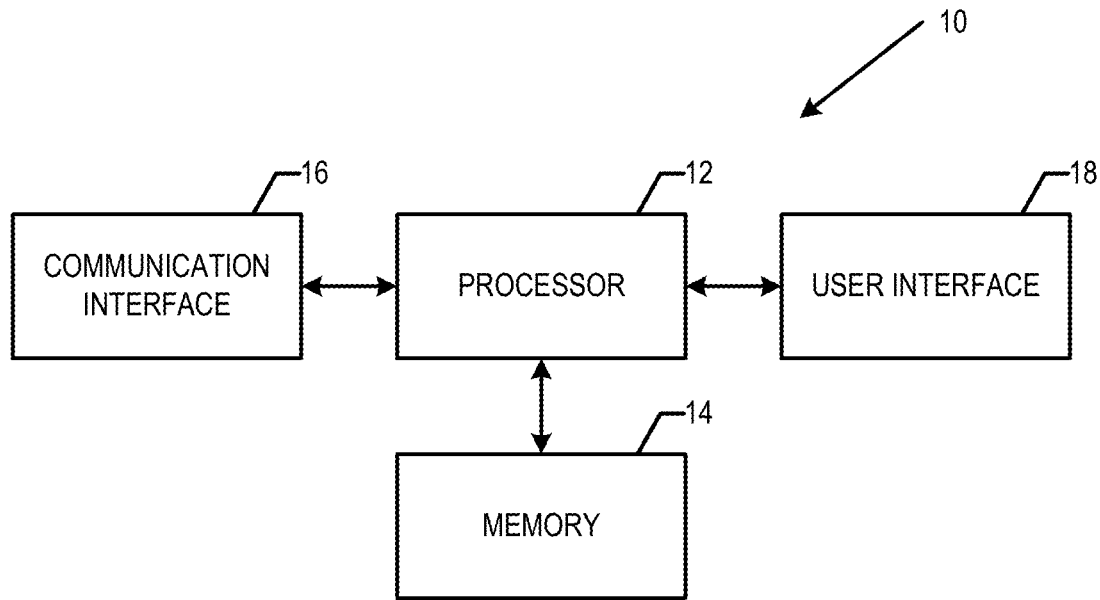
Figure 2B:
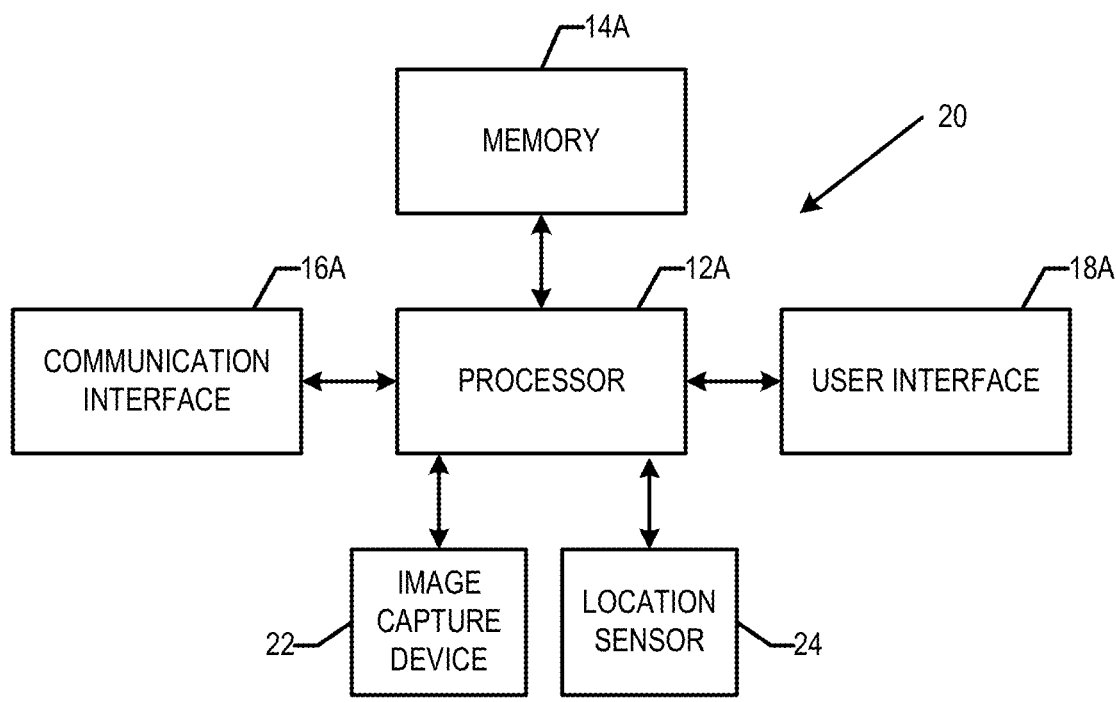
Figure 3:
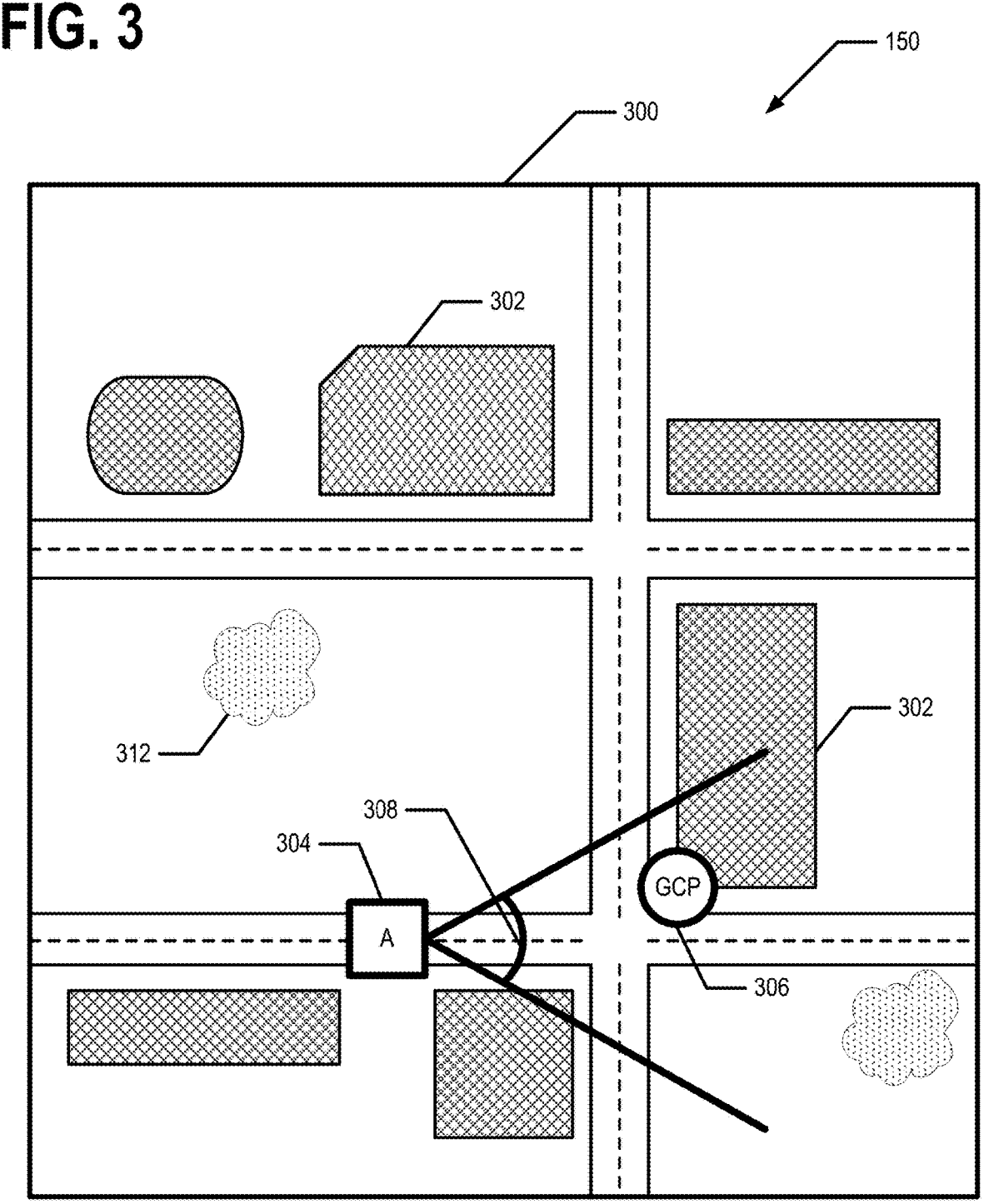
Figure 4:
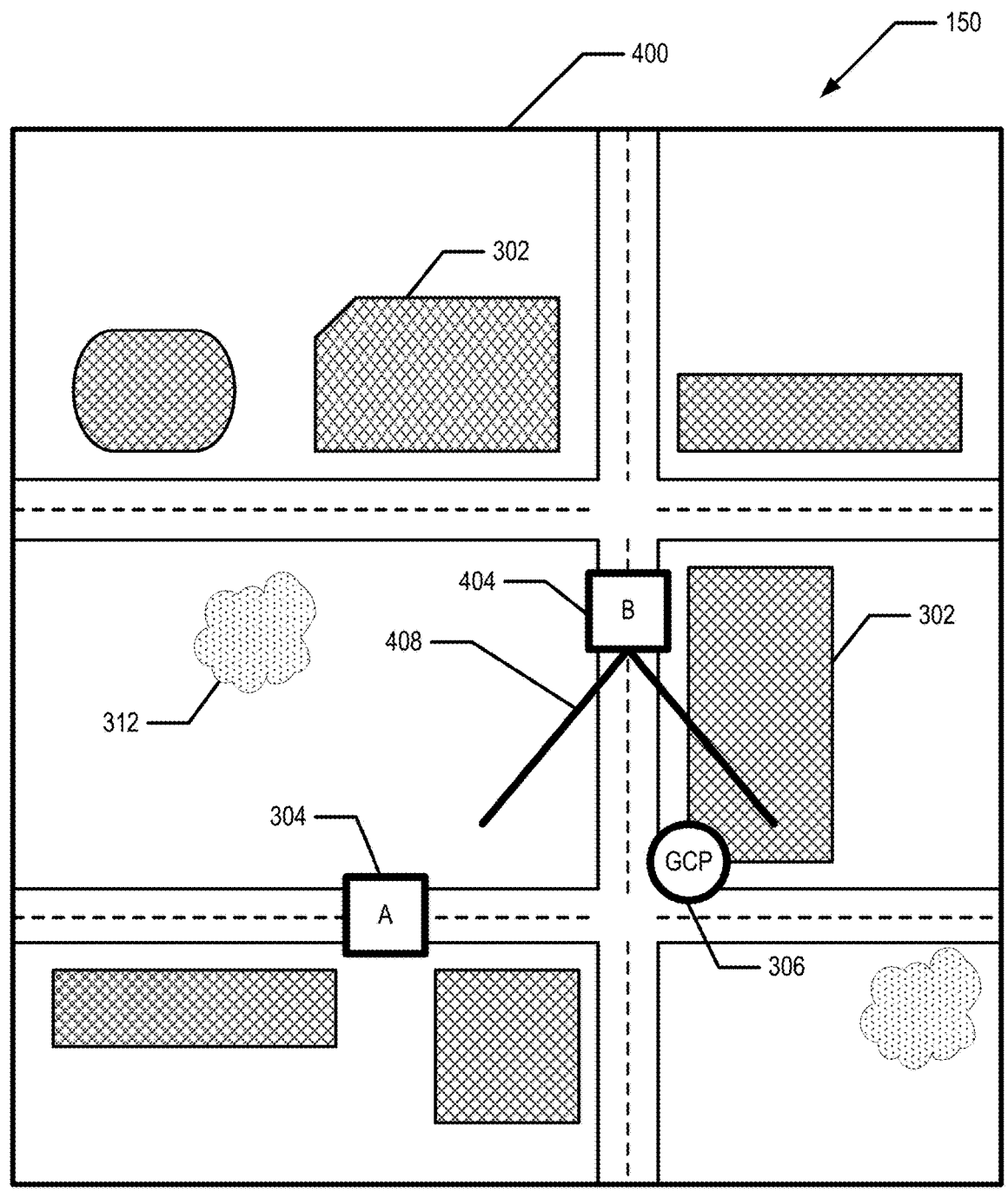
Figure 5:
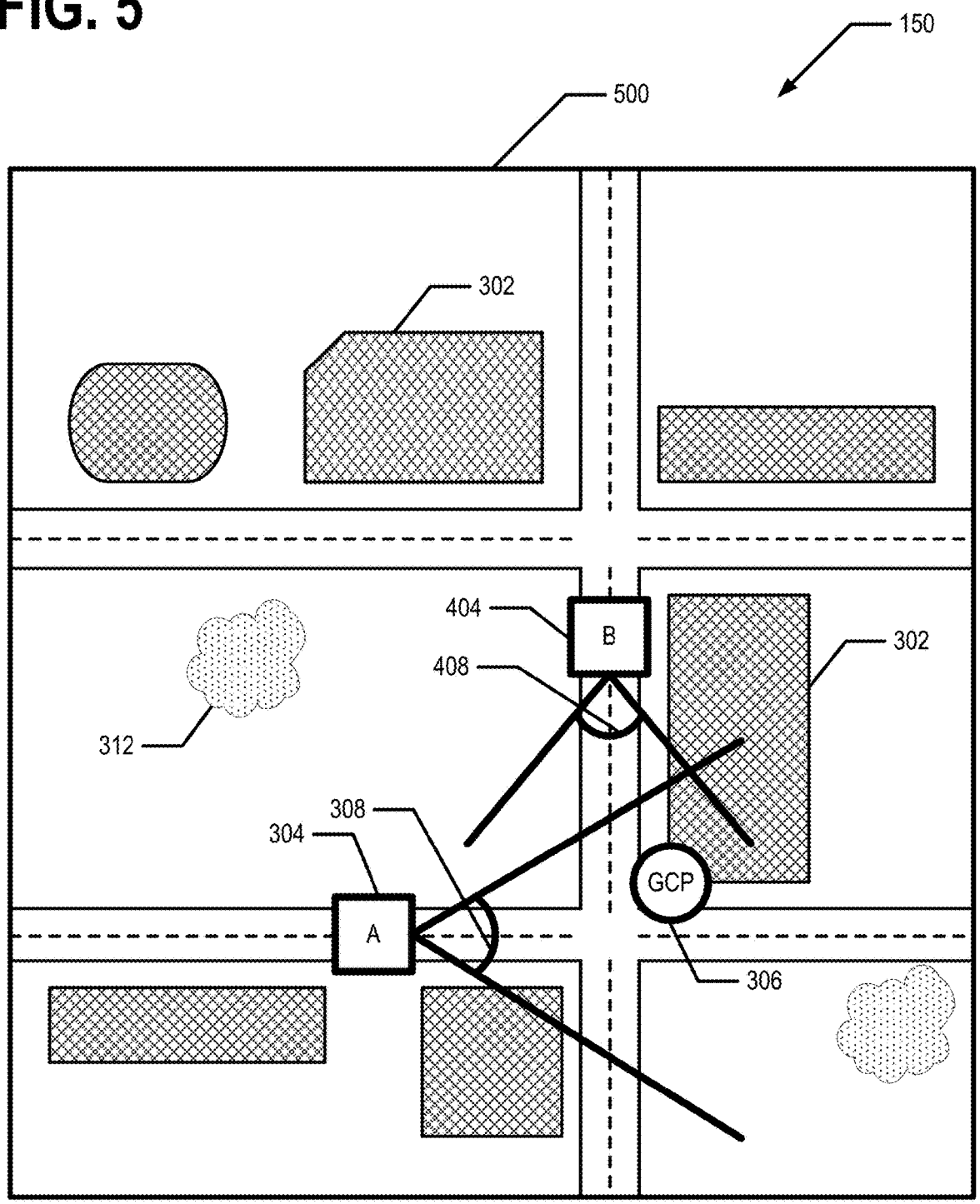
Figure 6:
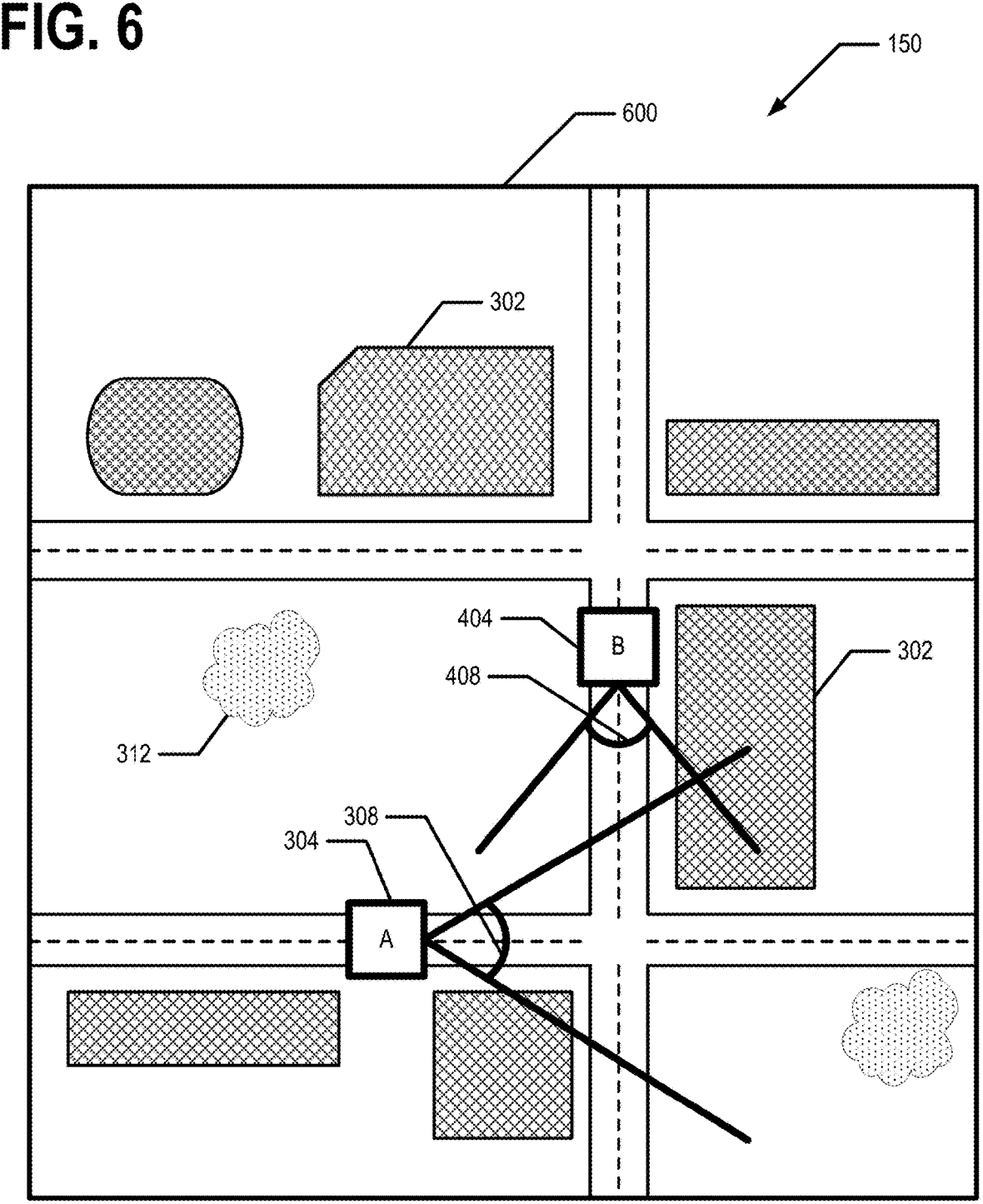
Figure 7:
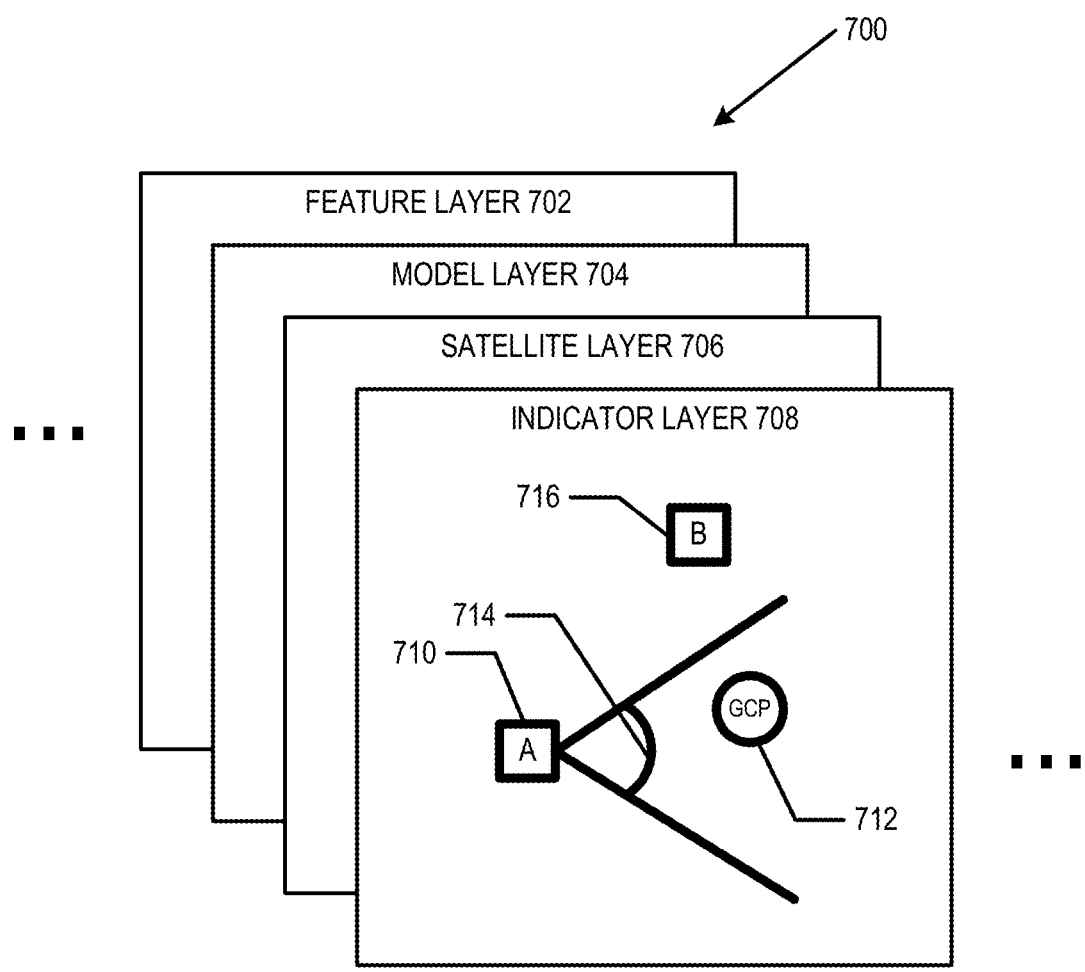
Figure 8:
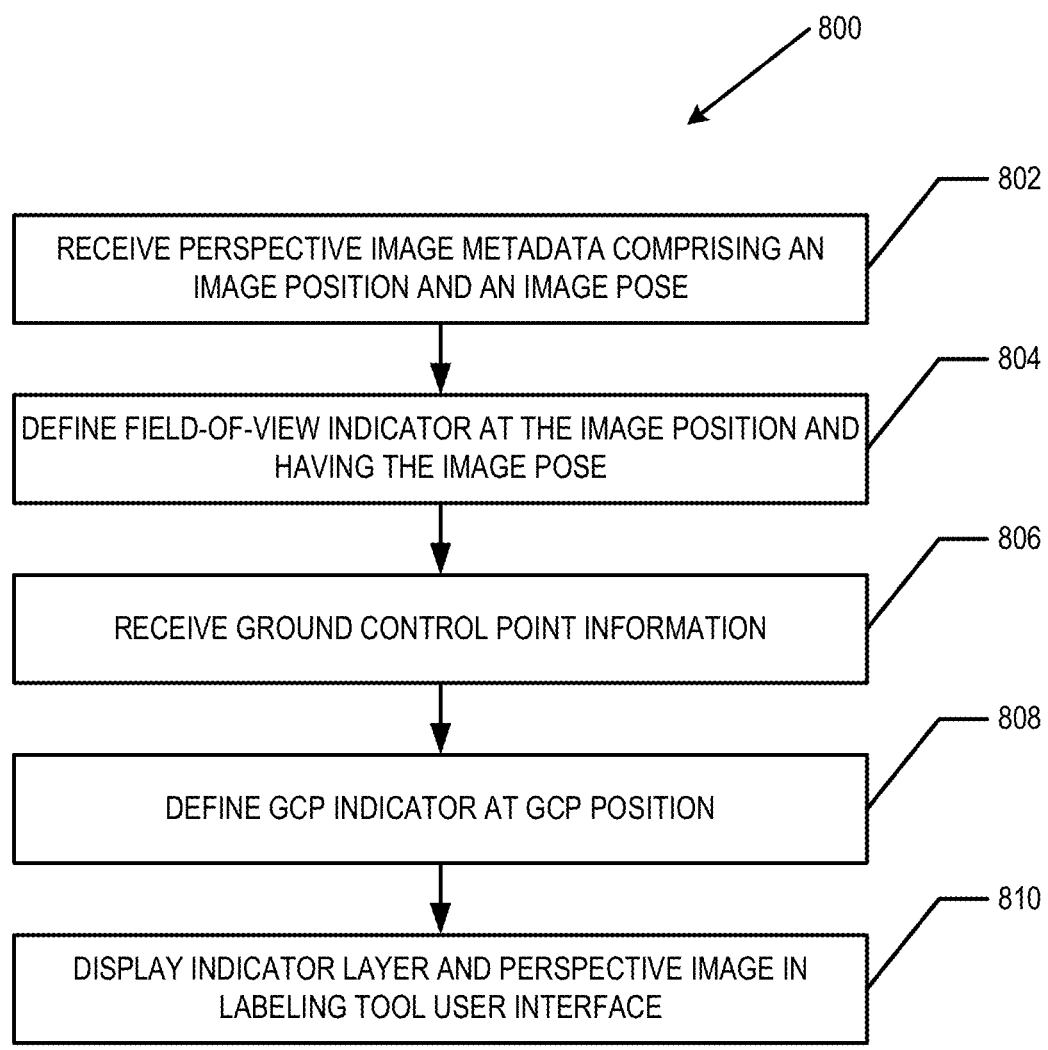
Figure 9A:
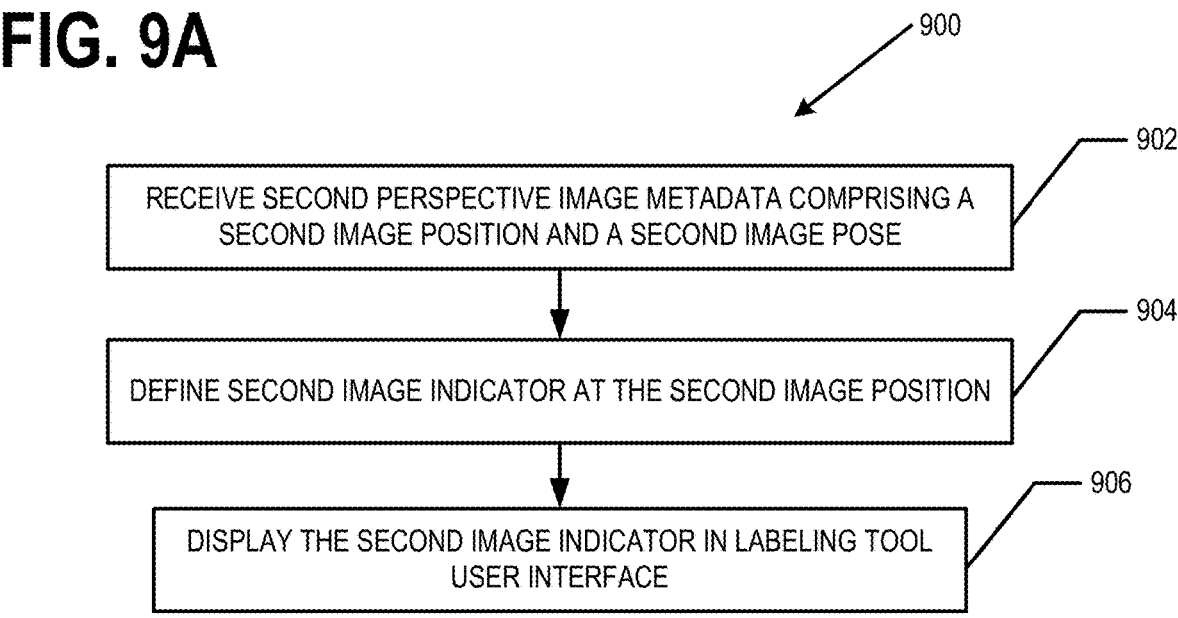
Figure 9B:
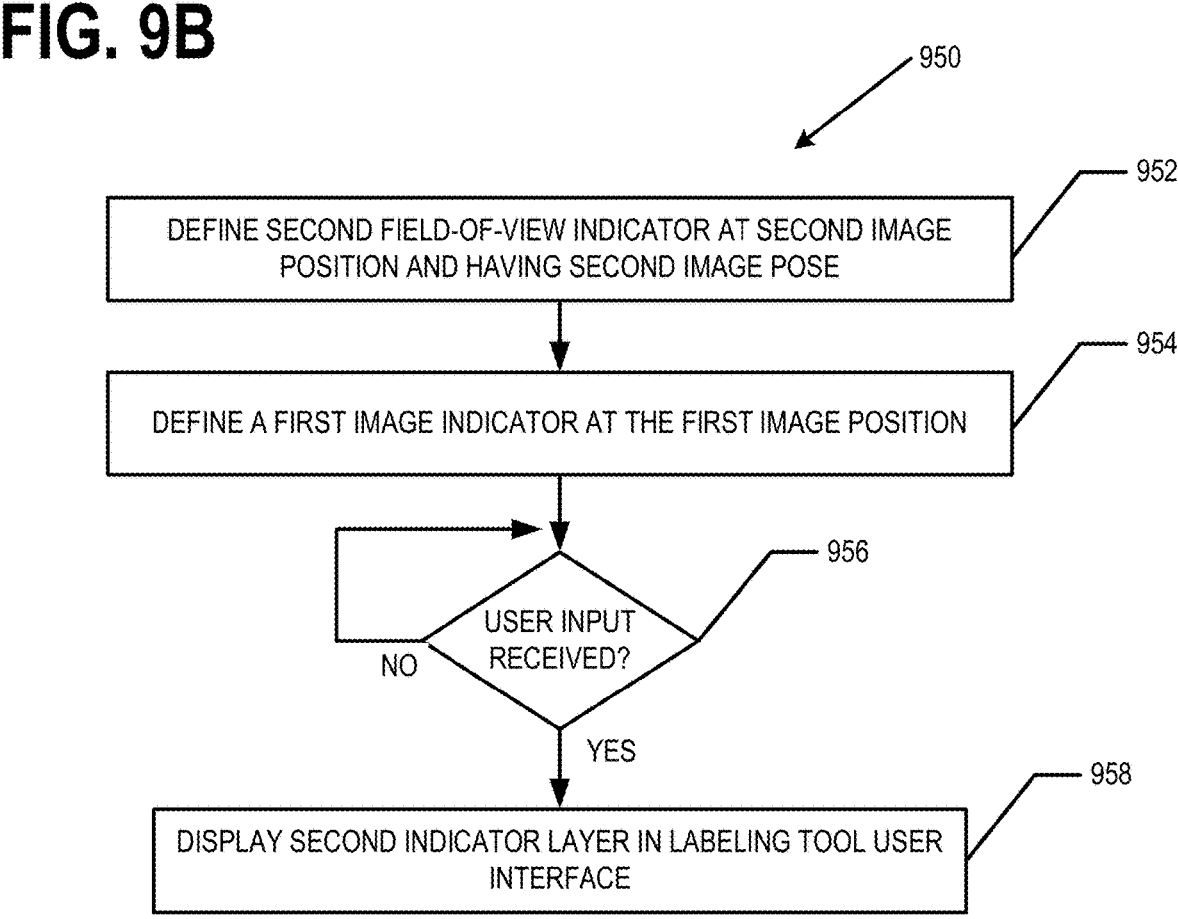
Figure 10:
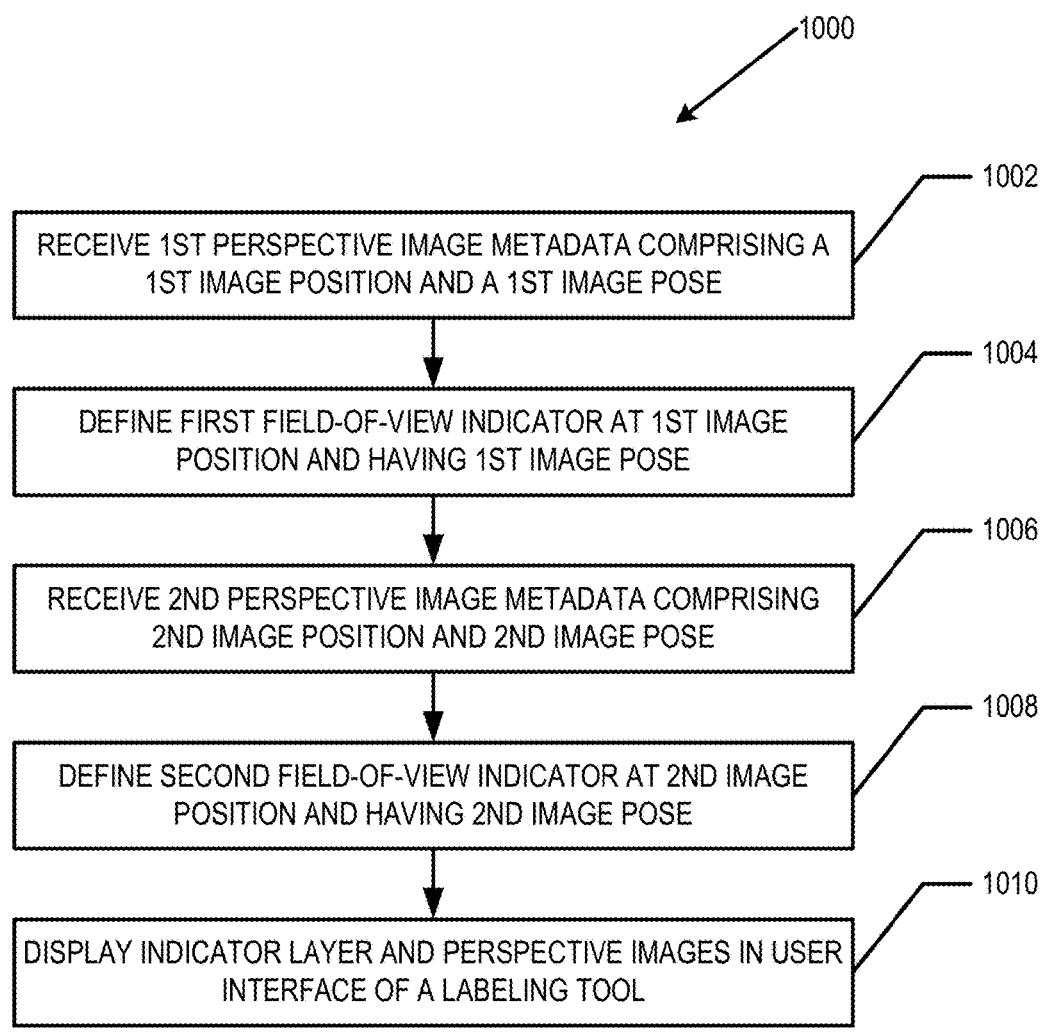
Figure 11:
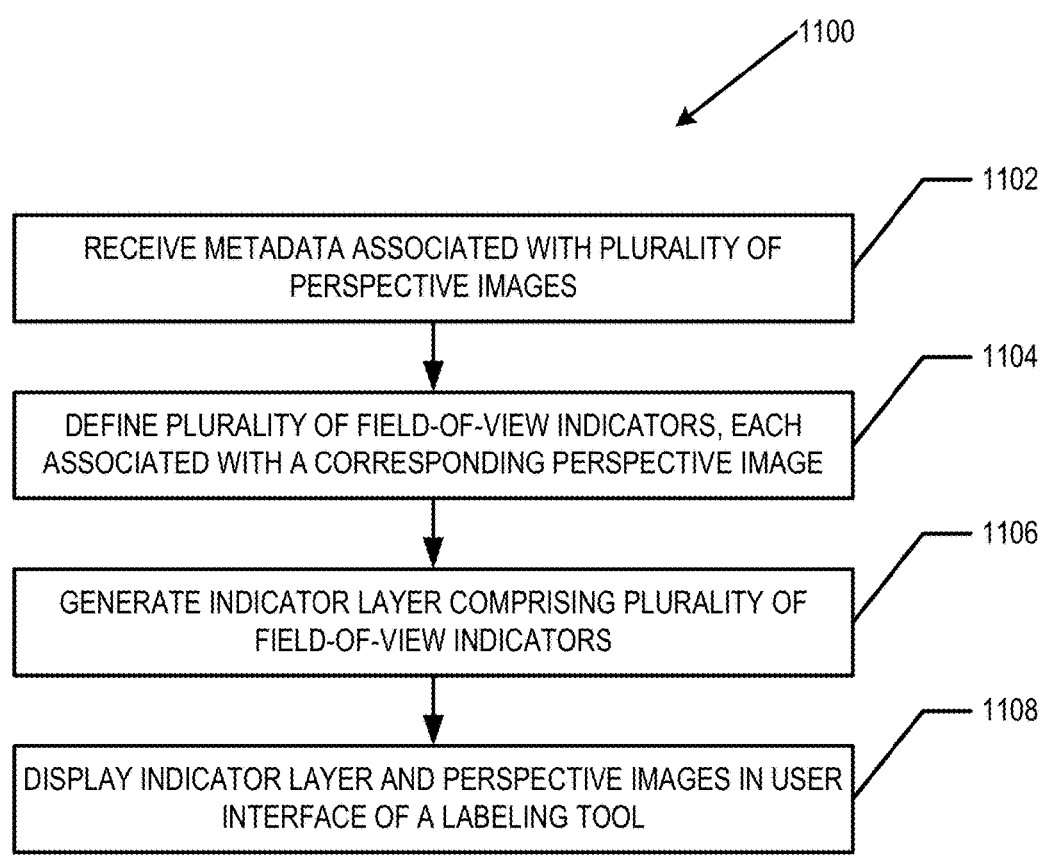
Figure 12:
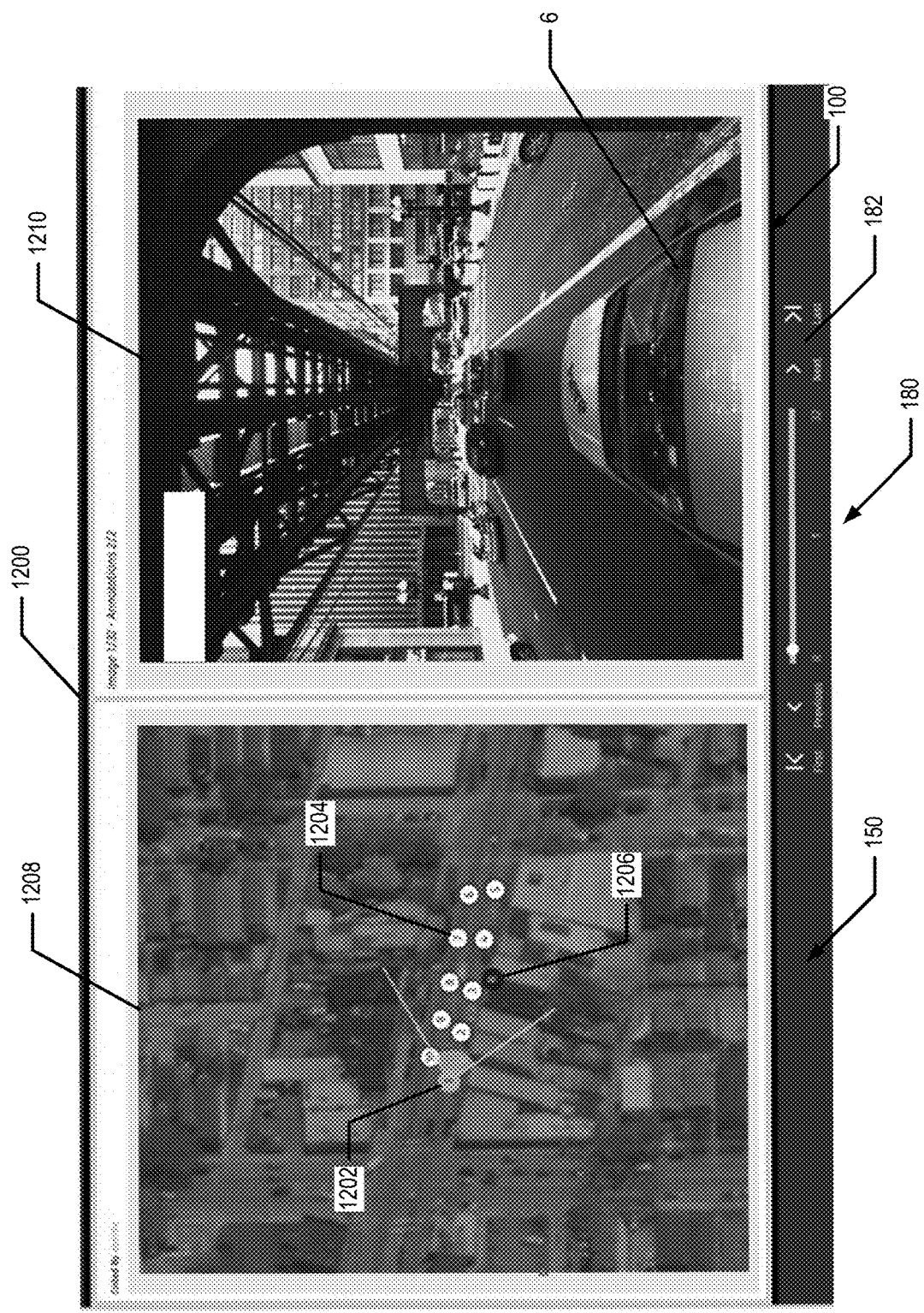
Figure 13:
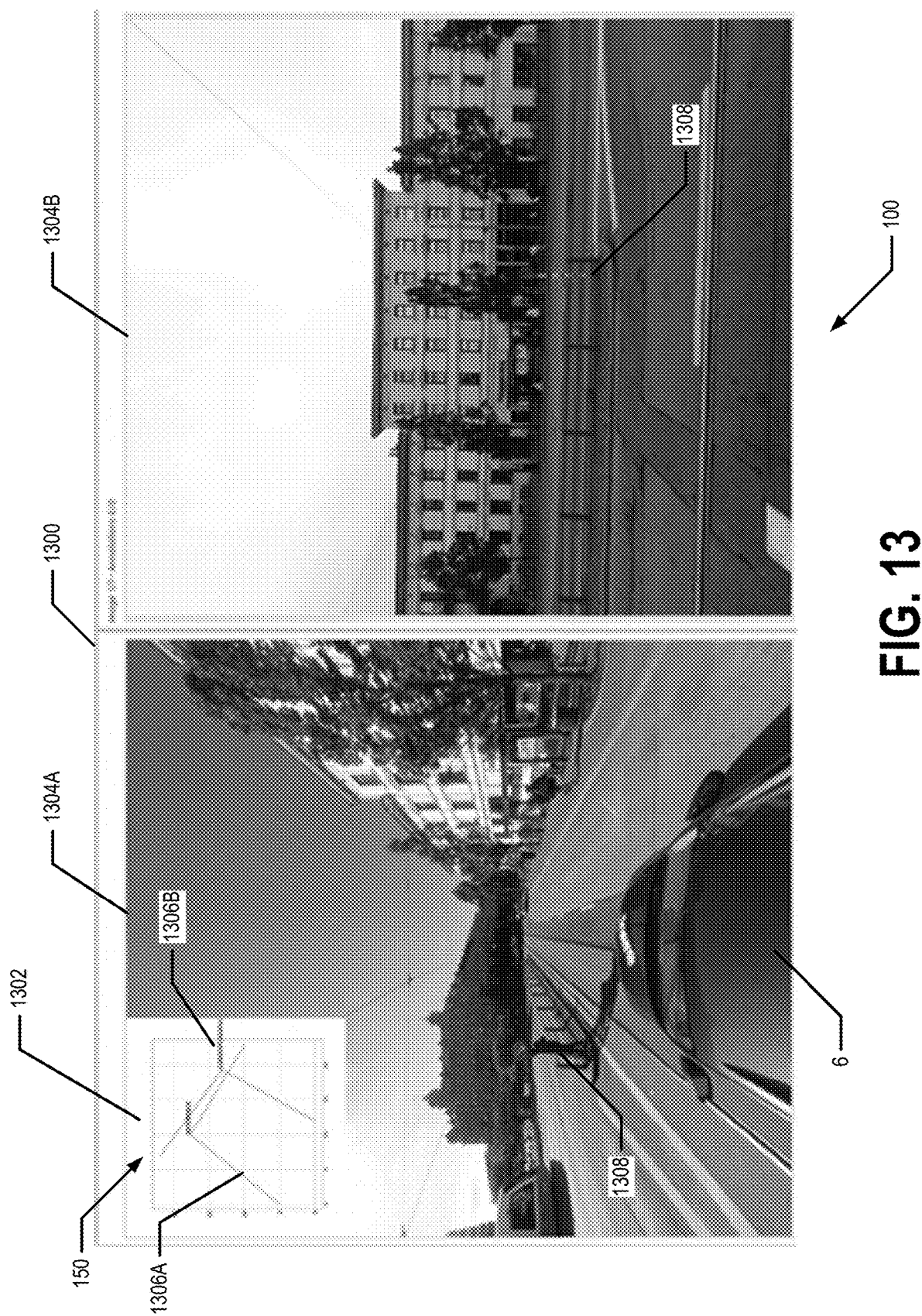

Having thus described certain example embodiments in general terms, reference will hereinafter be made to the accompanying drawings, which are not necessarily drawn to scale, and wherein:

FIG. 1 is a block diagram showing an example system of one embodiment of the present disclosure;

FIG. 2A is a block diagram of a user apparatus that may be specifically configured in accordance with an example embodiment;

FIG. 2B is a block diagram of a probe apparatus that may be specifically configured in accordance with an example embodiment;

FIG. 3 is a diagram illustrating an indicator layer overlay comprising a field-of-view indicator and a ground control point (GCP) indicator, in accordance with an example embodiment;

FIG. 4 is a diagram illustrating an indicator layer overlay comprising field-of-view indicators and a ground control point (GCP) indicator, in accordance with an example embodiment;

FIG. 5 is a diagram illustrating an indicator layer overlay comprising field-of-view indicators, in accordance with an example embodiment;

FIG. 6 is a diagram illustrating an indicator layer overlay comprising field-of-view indicators and a ground control point (GCP) indicator, in accordance with an example embodiment;

FIG. 7 is a diagram illustrating an example of a digital map database comprising layers, in accordance with an example embodiment;

FIG. 8 is a flowchart illustrating operations performed, such as by the user apparatus of FIG. 2A, in accordance with an example embodiment;

FIG. 9A is a flowchart illustrating operations performed, such as by the user apparatus of FIG. 2A, in accordance with an example embodiment;

FIG. 9B is a flowchart illustrating operations performed, such as by the user apparatus of FIG. 2A, in accordance with an example embodiment;

FIG. 10 is a flowchart illustrating operations performed, such as by the user apparatus of FIG. 2A, in accordance with an example embodiment;

FIG. 11 is a flowchart illustrating operations performed, such as by the user apparatus of FIG. 2A, in accordance with an example embodiment;

FIG. 12 is an example interactive user interface view of a labeling tool, in accordance with an example embodiment; and FIG. 13 is another example interactive user interface view of a labeling tool, in accordance with an example embodiment.

DETAILED DESCRIPTION

Some embodiments will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

As defined herein, a "computer-readable storage medium," which refers to a non-transitory physical storage medium (e.g., volatile or non-volatile memory device), can be differentiated from a "computer-readable transmission medium," which refers to an electromagnetic signal.

FIG. 1 provides an illustration of an example system that can be used in conjunction with various embodiments of the present disclosure. As shown in FIG. 1, the system may include one or more user apparatuses 10. In various embodiments, the user apparatus 10 may be a server or server system, in vehicle navigation system, vehicle control system, a mobile computing device, and/or the like. In an example embodiment, the user apparatus 10 may be an in-vehicle navigation system co-located with or located within a vehicle 6.

In an example embodiment, a user apparatus 10 may comprise components similar to those shown in the example user apparatus 10 diagrammed in FIG. 2A. In an example embodiment, the user apparatus 10 is configured to receive metadata associated with a perspective image and/or GCP information, define field-of-view and/or GCP indicators, and cause display of an indicator layer comprising the field-of-view and/or GCP indicators in a second portion of an interactive user interface (IUI) of a labeling tool. In another example embodiment, the user apparatus 10 is configured to receive metadata associated with a first perspective image and a second perspective image, define field-of-view indicators for each of the first and second perspective images, and cause display of an indicator layer comprising the field-of-view indicators in a second portion of an interactive user interface (IUI) of a labeling tool. In an example embodiment, as shown in FIG. 2A, the user apparatus 10 may comprise a processor 12, memory 14, a communications interface 16, a user interface 18, and/or other components configured to perform various operations, procedures, functions or the like described herein. In at least some example embodiments, the memory 14 is non-transitory and may store information/data corresponding to metadata associated with perspective images and/or GCP information. For example, the memory 14 may store a database storing perspective images and/or metadata associated with perspective images and/or GCP information. In further example embodiments, the memory 14 may store information/data corresponding to field-of-view indicators, image indicators, and GCP indicators in general. For example, the memory 14 may store template images, symbols, and/or overlays that may be adapted for use as field-of-view indicators, image indicators, and/or GCP indicators. The memory 14 may further store information/data and/or instructions for defining a field-of-view indicator and/or a GCP indicator and causing display of an indicator layer comprising the indicators. For example, the memory 14 may store application and/or program code that, when executed by the processor 12, causes the user apparatus 10 to provide an IUI of a labeling tool (e.g., via user interface 18). In various embodiments, the labeling tool may be an application (e.g., provided through the execution of program code by the processor) configured to provide an interactive user interface to enable a user to perform tasks comprising and/or corresponding to identifying and/or labeling one or more pixels of one or more images. Examples of such tasks include GCP identification, GCP labeling, feature correspondence, and image alignment. For example, the labeling tool may comprise an interactive user interface (IUI) that may display data for a user to view and may allow user interaction, such as data input and labeling (e.g., pixel labeling). For example, the application and/or program code, when executed by the processor 12, may cause a first portion 100 of the IUI of the labeling tool to display one or more perspective images and a second portion 150 of the IUI of the labeling tool to display an indicator layer.

In various example embodiments, the communication interface 16 may allow the user apparatus 10 to be in electronic communication with other user apparatuses 10 over a network 8 as shown in FIG. 1. A network 8 may be a wired or wireless Personal Area Network (PAN), Local Area Network (LAN), Metropolitan Area Network (MAN), Wide Area Network (WAN), Wi-Fi, Bluetooth, Bluetooth Low Energy (BLE), cellular network (3G/4G/5G), and/or the like. In some embodiments, a network 8 may comprise the automotive cloud, digital transportation infrastructure (DTI), radio data system (RDS)/high definition (HD) radio or other digital radio system, and/or the like. A network 8 may allow shared computer processing resources and data between any number of user apparatuses 10 connected thereto. For example, a user apparatus 10 may be configured to receive perspective images, GCP information and/or an indicator layer through the network 8 from another user apparatus 10. In an example embodiment, a user apparatus 10 may receive metadata associated with a perspective image and GCP information, and another user apparatus 10 may, as a result of some communication over network 8, define a field-of-view indicator and/or a GCP indicator and may cause display of an indicator layer comprising the field-of-view indicator and/or the GCP indicator in an interactive user interface (IUI) of a labeling tool via a user interface 18 of yet another user apparatus 10. In another example embodiment, a user apparatus 10 may receive metadata associated with a first perspective image and metadata associated with a second perspective image, and another user apparatus 10 may, as a result of some communication over network 8, define first and second field-of-view indicators corresponding to the first and second perspective images and may cause display of an indicator layer comprising the field-of-view indicators in an interactive user interface (IUI) of a labeling tool via a user interface 18 of yet another user apparatus 10.

In various example embodiments, the user interface 18 may allow a user to interact with the user apparatus 10. More specifically, a user may input data to the user apparatus 10 through the user interface 18, and receive/observe output data from the user apparatus 10 through the user interface 18. For example, the user interface 18 may comprise a computer screen, monitor, television, projected display, and/or other output circuitry/device configured to display an indicator layer overlay in a user interface of a labeling tool for user interaction. For example, the user interface 18 may comprise a keyboard, mouse, touch screen, and/or other input circuitry/device configured to receive user-defined parameters involved in the defining of an indicator layer overlay. In an example embodiment, the user interface 18 may be configured to provide (e.g., display) an interactive user interface (IUI) of a labeling tool and to receive input to enable user interaction with the labeling tool, such as viewing the displayed indicator layer or inputting various commands.

The system as shown in FIG. 1 may further comprise a probe apparatus 20. In an example embodiment, the probe apparatus 20 may be co-located, located within, or attached to a vehicle 6. The probe apparatus 20 may be a sensor system comprising Global Navigation Satellite System (GNSS), such as Global Positioning System (GPS), for example, Inertial Measurement Units (IMU), camera, LIDAR, RADAR, and/or other sensor systems that may capture data, such as perspective images, of the surroundings. The probe apparatus 20 may also capture data of its own position and its own pose, for example using a GNSS, IMU, and/or visual localization techniques. In an example embodiment, the probe apparatus 20 may be oriented in order to capture data, such as perspective images, of the surroundings in a particular orientation and in a particular field-of-view. For example, the probe apparatus 20 may be co-located, located within, or attached to a vehicle 6 such as to capture a portion of the surroundings of the vehicle 6. The pose or orientation of the probe apparatus 20 may further depend at least on the orientation of the vehicle 6. For example, a probe apparatus 20 may be attached inline or parallel with a vehicle 6 such that when the vehicle 6 is oriented, and possibly driving, in a particular direction, the probe apparatus 20 is also oriented in the same direction and capturing perspective images in the particular direction. In an example embodiment, multiple probe apparatuses 20 may be attached to a vehicle 6, each probe apparatus 20 capturing a different portion of the surroundings of the vehicle 6. For example, a vehicle 6 may have four probe apparatuses 20 attached, each with an approximate field-of-view of 90 degrees and oriented such that all 360 degrees of the surroundings are captured. In another example, a probe apparatus 20 may comprise multiple image capture devices with each image capture device secured and/or disposed in a particular orientation with respect to the vehicle 6.

In an example embodiment, a probe apparatus 20 may comprise components similar to those shown in the example probe apparatus 20 diagrammed in FIG. 2B. In an example embodiment as shown in FIG. 2B, the probe apparatus may comprise a processor 12A, memory 14A, a communications interface 16A, a user interface 18A, an image capture device 22, a location sensor 24, and/or other components configured to perform various operations, procedures, functions and/or the like describes herein. For example, a probe apparatus 20 may be configured to capture perspective images using the image capture device(s) 22, and determine an image position and an image pose for each perspective image using the location sensor(s) 24. The probe apparatus 20 may determine a latitude, longitude, and/or elevation at which it captured a perspective image and associate such positional data as metadata with the perspective image. In at least some example embodiments, the memory 14A is non-transitory and may store information/data corresponding to perspective images and the position and the pose of the probe apparatus 20.

In various example embodiments, the probe apparatus 20 may comprise means for causing the image capture device 22 to capture a perspective image. The image capture device 22 may be a camera with a particular field-of-view. For example, the image capture device 22 may be a camera with a typical field-of-view between 60 to 110 degrees. In another example, the image capture device may be a camera fitted with a fish-eye lens with a field-of-view angle of 180 degrees. In various example embodiments, the perspective image may be in a particular form or of a particular type based at least in part on the image capture device 22. For example, the perspective image may be an infrared or a thermal image if the image capture device 22 is an infrared camera or thermal camera, respectively. In an example embodiment, the image capture device 22 is an optical camera and the perspective images are optical images. The image capture device 22 may also be capable of recording video, or capturing perspective images at a high frequency rate. In various embodiments, the image capture device(s) 22 capture ground-based images.

In various example embodiments, the probe apparatus 20 may comprise means for causing the location sensor(s) 24 to determine a position and pose of the probe apparatus 20. For example, the location sensor(s) 24 may be configured to receive GNSS signals to determine the latitude, longitude, and/or elevation of the probe apparatus 20. In another example, the location sensor(s) 24 may be an IMU and the processor 12A may use sensor information/data captured by the IMU to determine the latitude, longitude, and/or elevation of the probe apparatus 20. The location sensor 24 may also be configured to use an IMU, GNSS, accelerometer, magnetic compass, and/or any other means for determining a pose or orientation of the probe apparatus 20.

In various embodiments, the labeling tool may be an application (e.g., provided through the execution of program code by the processor) configured to provide an interactive user interface to enable the user to perform tasks comprising and/or corresponding to identifying and/or labeling one or more pixels of one or more images. Examples of such tasks include GCP identification, GCP labeling, feature correspondence, and image alignment. For example, the labeling tool may comprise an interactive user interface (IUI) that may display data for a user to view and may allow user interaction, such as data input and pixel labeling. The IUI of the labeling tool may comprise and/or be divided into multiple portions. In various example embodiments, the first portion 100 is a primary portion of the IUI and the second portion 150 is a secondary portion of the IUI. For example, the first portion 100 may be a container window or browser window of the IUI of the labeling tool, while the second portion 150 may be a child window (e.g., pop up window), browser window, or message window of the IUI of the labeling tool. In an example embodiment, the first portion 100 and the second portion 150 of the IUI may be displayed within the same window (e.g., in a container window, browser window, and/or the like). For example, the first portion 100 and the second portion 150 of the IUI may be within different frames of the same window. In various example embodiments, the first portion 100 of the IUI of the labeling tool may display at least one perspective image, and the second portion 150 of the IUI of the labeling tool may display an indicator layer overlay, which may be an indicator layer displayed overlaid on at least one digital map layer. In various example embodiments, the displayed contents of the first portion 100 of the IUI may be in some way related to the displayed contents of the second portion 150 of the IUI such that a user may view corresponding and/or paired data.

FIG. 3 diagrams an example indicator layer overlay of the present disclosure. The methods, apparatuses, and computer program products disclosed herein may cause display of an indicator layer 300 in a portion of an IUI of a labeling tool (e.g., a second portion 150 of the IUI). As shown in FIG. 3, the indicator layer 300 may comprise a field-of-view indicator 308 and a GCP indicator 306. In various embodiments, the field-of-view indicator 308 corresponds to a perspective image and comprises two lines or arms that extend from an indicator position of the field-of-view indicator in a field-of-view orientation for a particular length. In various embodiments, a field-of-view indicator is defined by the indicator position, the field-of-view orientation, and the particular length. In various embodiments, the field-of-view indicator 308 comprises two arms that extend outward from the indicator position to illustrate an angle corresponding to and/or substantially equal the field-of-view of the image capture device 22 that captured the corresponding perspective image. In various embodiments, the field-of-view indicator 308 is orientated in accordance with the image pose, which may be received as metadata corresponding to the perspective image.

The field-of-view indicator 308 corresponds to a perspective image and may be defined to provide informative visual context representative of metadata associated with the corresponding perspective image to a user viewing the IUI of the labeling tool. For example, the field-of-view indicator 308 may have an indicator position at the image position, the image position being received as metadata associated with the perspective image. For example, the indicator position of the field-of-view indicator 308 may be set and/or defined as being substantially equal to the image position. The indicator position of the field-of-view indicator 308 may be defined in the indicator layer overlay 300 by determining or calculating a location in pixel space. For example, each pixel of the indicator layer overlay 300 being displayed in the second portion 150 of the IUI of the labeling tool may have a correspondence to a coordinate point (e.g., latitude and longitude) or a finely resolved/defined coordinate area, such that a pixel of the indicator layer overlay 300 may represent the image position and be defined as the indicator position of the field-of-view indicator 308. In the example second portion 150 of the IUI of the labeling tool shown in FIG. 3, the field-of-view indicator 308 specifically has an indicator position at the middle of a road spanning East and West, and to the West of an intersection of said road and another road spanning North and South (assuming the top of FIG. 3 represents North with the rest of the cardinalities following accordingly). The field-of-view indicator 308 having this indicator position suggests to a user viewing the IUI of the labeling tool that the corresponding perspective image was captured by an image capture device 22 of a probe apparatus 20 at the indicator position. Even further analysis might suggest to a user that the probe apparatus 20 that captured the perspective image may be co-located, located within, or attached to a vehicle 6 given its position on a road.

Indicator layer 300 also comprises an image indicator 304 also having an indicator position at the image position, thus appearing connected to or otherwise associated with the field-of-view indicator 308. For example, the indicator position of the image indicator 304 may be set and/or defined as being substantially equal to the image position. The indicator position of the image indicator 304 may be defined by determining or calculating a location in the pixel space of the indicator layer 300 corresponding to the image position. In various example embodiments, the image indicator 304 may be defined to be associated with the field-of-view indicator 308 and corresponding to the perspective image, and displayed in the second portion 150 of the IUI of the labeling tool to provide a clearer indication of the image position. For example, the image indicator 304 may comprise a label or identifier, such as an "A" as illustrated to indicate that the image position corresponds to a perspective image "A". In another example, the image indicator 304 may comprise a filename identifier or other type of representation of the perspective image. In yet another example, the image indicator 304 may comprise a label or identifier such as a "1" to indicate that the corresponding perspective image may be the first perspective image out of a set of perspective images. In various example embodiments, the image indicator 304 may not be defined or may not be displayed in the IUI of the labeling tool to prevent visual clutter. In various example embodiments, the user may be able to configure in the IUI of the labeling tool whether the image indicator 34 is displayed.

As illustrated in FIG. 3, the field-of-view indicator 308 is defined to have the image pose, the image pose also being received as metadata associated with the corresponding perspective image. The field-of-view indicator 308 may be oriented according to the image pose by comprising two lines, as illustrated, that indicate the direction of the image pose as well as indicate an approximate field-of-view of the corresponding perspective image. The two lines of the field-of-view indicator 308 may extend from the image position in the direction of the image pose. For example, FIG. 3 shows the two lines of the field-of-view indicator 308 extending from the image position towards the East, indicating that the image pose was towards the East. This indication of image pose suggests to a user viewing the IUI of the labeling tool that the corresponding perspective image was captured by an image capture device 22 of a probe apparatus 20 that was oriented towards the East. The perspective image would therefore be an image of the surroundings to the East of the probe apparatus 20, and features positioned to the East of the probe apparatus 20 would be visible in the perspective image. Based on the image position and image pose indicated by the field-of-view indicator 308 and the orientation of the road and surrounding landscape, the user viewing the second portion 150 of the IUI of the labeling tool may further infer that the corresponding perspective image may have been captured by either a probe apparatus 20 attached to a vehicle 6 traveling in an Eastbound direction and oriented towards the front of the vehicle 6, or a probe apparatus 20 attached to a vehicle 6 traveling in a Westbound direction and oriented towards the back of the vehicle 6. In various example embodiments, the pose or orientation of the probe apparatus 20 relative to the pose or orientation of the vehicle 6 may be illustrated or described in the IUI of the labeling tool. In various example embodiments, pose or orientation of the probe apparatus 20 relative to the pose or orientation of the vehicle 6 may be metadata associated with the perspective image, and a vehicle indicator may be defined and displayed.

In various example embodiments, the length of the two lines of the field-of-view indicator 308 may be configurable. That is, the user may specify a desired length of the two lines that would eliminate unnecessary visual clutter while still enabling a user to understand an indicated image pose and corresponding field-of-view. In other example embodiments, the length of the two lines of the field-of-view indicator 308 is a set length. For example, the length of the two lines of the field-of-view indicator 308 may be set based on an expected field-of-view of the image capture device 22, visibility conditions corresponding to when the perspective image was captured, one or more parameters of the IUI and/or user interface 18, and/or the like. For example, the length of the two lines of the field-of-view indicator 308 may be defined according to received metadata associated with the perspective image. For example, the received metadata may comprise a focal depth of the perspective image and/or a focal depth of the image capture device 22 when capturing the perspective image, and the length of the two lines of the field-of-view indicator 308 may be defined to be proportional and indicative of the focal depth. As such, a relationship between distance measurements in the real world and numbers of pixels may be established and/or calculated so that at least the length of the two lines of the field-of-view indicator 308 may be defined accurately in pixel space when displayed in the second portion 150 of the IUI. Defining the field-of-view indicator 308 as such may enable a user to quickly identify features that may be clearly resolved in the perspective image by tracing the features located at the ends of the lines of the field-of-view indicator 308 as displayed in the labeling tool. In other example embodiments, the perspective image may be analyzed through various image processing and image analysis techniques to determine and calculate a focal depth, with the field-of-view indicator 308 being defined accordingly.

The field-of-view indicator 308 may also comprise an arc defined between the two lines extending from the image position, as so shown in FIG. 3. The arc may provide additional visual clarity to a user as to the indicated image pose. In various example embodiments, the arc of the field-of-view indicator 308 may represent an approximate field-of-view of the perspective image and/or the image capture device 22 when capturing the perspective image. For example, the metadata associated with the perspective image may comprise a field-of-view angle characteristic of the perspective image, and the arc of the field-of-view indicator 308 may be defined to span such an angle. For instance, the metadata associated with the perspective image may state that the perspective image has a field-of-view of 90 degrees, thus causing the arc of the field-of-view indicator 308 to span 90 degrees. It will be understood that with the arc defining the angle between the two lines of the field-of-view indicator 308, the two lines may also be defined according to the field-of-view angle. In an example embodiment, the perspective image may be analyzed through image processing and image analysis techniques to determine and calculate a field-of-view angle, with the field-of-view indicator 308 being defined based at least in part on a result of the analysis of the perspective image. For example, the perspective image may be analyzed to find vanishing points or horizons and a field-of-view angle may then be calculated.

In other example embodiments, the arc of the field-of-view indicator 308 may be defined according to the field-of-view angle of the image capture device 22 that captured the perspective image. For example, the characteristics of the image capture device 22 may be known, and the arc of the field-of-view indicator 308 may be defined according to the field-of-view characteristic of the image capture device 22. As mentioned previously, the image capture device 22 may be fitted with a normal wide angle camera lens, a fisheye camera lens, and/or the like, such as to capture perspective images with different field-of-views. In another example embodiment, the arc of the field-of-view indicator 308 may simply be defined to span a default angle, such a default angle determined to an approximate representation of the field-of-view of the perspective image.

As shown in FIG. 3, the indicator layer 300 may comprise a GCP indicator 306. As illustrated in FIG. 3, the GCP indicator 306 may be defined to have an indicator position based on received GCP information. Specifically, the received GCP information may comprise a GCP location as well as other metadata associated with the GCP. This GCP location may be exact as to include longitude, latitude, and/or elevation. As such, the GCP indicator 306 may be defined to have an indicator position at and/or substantially equal to the GCP location. The indicator position of the GCP indicator 306 may be defined in the indicator layer overlay 300 by determining or calculating a location in pixel space. For example, each pixel of the indicator layer overlay 300 being displayed in the second portion 150 of the IUI of the labeling tool may have a correspondence to a coordinate point (e.g., latitude and longitude) or a finely resolved/defined coordinate area, such that a pixel of the indicator layer overlay 300 may represent the GCP location and defined as the indicator position of the GCP indicator 306. In the example embodiment illustrated in FIG. 3, the GCP indicator 306 is positioned at the Southwest corner of a building 302 located East of the road spanning North and South. The position of the GCP indicator 306 may suggest to a user viewing the IUI of the labeling tool that the GCP of interest that is to be identified and labelled in the perspective image is located at said Southwest corner of said building 302. In an example embodiment, the IUI of the labeling tool may further provide an alert if the GCP indicator 306 has an indicator position between the two lines of the field-of-view indicator 308; in other words, the IUI of the labeling tool may explicitly indicate to a user that the GCP should be within the approximate field-of-view of the perspective image. In various example embodiments, an alert is not explicitly generated, and the display of the field-of-view indicator 308 and the GCP indicator 306 may be considered enough context for a user. In various example embodiments, the GCP indicator 306 may be further defined to indicate an elevation difference relative to the perspective image. For example, the GCP indicator 306 may comprise a carat symbol, an upwards arrow, and/or the like if the elevation of the GCP is higher than the elevation of the image position, thus suggesting to a user that the GCP may be visible towards the top portion of the perspective image or even out of the vertical field-of-view of the perspective image. For example, a GCP may be located at a particular corner of a building and may thus be located above the level of the image capture device 22. In another example, the GCP may be a particular position of a road marking on the surface of the pavement and may therefore be located below the level of the image capture device 22. Likewise, the GCP indicator 306 may comprise a downwards arrow, an underline, and/or the like if the elevation of the GCP is lower than the elevation of the image position, suggesting that the GCP may be towards the bottom of the perspective image or out of frame. In various example embodiments, the GCP indicator 306 may be configurable defined and/or configurable displayed. For example, a user may specify through the IUI of the labeling tool a size of the GCP indicator 306 to avoid visual clutter or to enlarge and provide more clarity. Other physical properties such as color, shape, and/or the like may also be configurable. In various example embodiments, the GCP indicator 306 may be defined by default to distinguish from the image indicator 304 to signify the difference in information indicated, such as by being a different shape or different color.

As illustrated in FIG. 3, the indicator layer 300 may be displayed overlaid on one or more digital map layers, where a digital map layer displays the environment and surroundings in an overhead view. For example, the indicator layer 300 may comprise a field-of-view indicator 308, an image indicator 304, and a GCP indicator 306, and be overlaid on a digital map layer that comprises a representation of the road network topology, buildings 302, trees 312, and/or the like. As seen in the example second portion 150 of the IUI in FIG. 3, the overlaying of the indicator layer 300 on the digital map layer provides additional context to a user as to the specific positions of the various indicators as well as the approximate field-of-view(s) indicated by the various indicators. For example, the understanding that the GCP indicator 306 indicates a GCP located at the Southwest corner of the building 302 as previously described may arise due to the overlaying of the GCP indicator 306 on the digital map layer displayed the building 302.

Referring now to FIG. 7, various digital map layers of a digital map database are shown. The digital map layer on which the indicator layer may be overlaid may be one of a satellite layer 706, a two-dimensional or three-dimensional model layer 704, a feature layer 702, or other layer of the digital map. As further made clear in FIG. 7, an indicator layer 708 may comprise indicators, such as a field-of-view indicator 714, image indicators 710 and 716, and a GCP indicator 712. In an example embodiment, an indicator layer (such as indicator layer 708) may be displayed in the second portion 150 of an IUI of a labeling tool independently of a layer of the digital map. For example, indicator layer 708 demonstrates that without being displayed overlaid on a digital map layer, there is still context being provided to a user as to the relative positions of the indicators to each other. For example, it is shown that the GCP indicator 712 is positioned within the approximate field-of-view of the perspective image corresponding to the field-of-view indicator 714. However, it may not be explicitly apparent as to what the GCP is or where it is exactly located in the environment or surroundings. In various example embodiments, the indicator layer 708 may be displayed overlaid the satellite layer 706 to provide area detail. The satellite layer 706 may be a satellite image or other overhead image of the surroundings, or in an example embodiments, the satellite layer 706 may be a satellite feed or video of the surroundings. In an example embodiment, the satellite layer 706 may be a satellite image taken at substantially the same time as the perspective image was captured. In various example embodiments, the satellite layer 706 may be an ortho-rectified satellite image in order to provide an accurate overhead view.

In various example embodiments, the indicator layer 708 may alternatively or additionally be displayed overlaid on a model layer 704, which may display more abstract models of significant features of the environment such as large buildings, roads, and bodies of water. The model layer 704 may not comprise the same amount of detail as the satellite layer 706, thus conserving processing power when displaying in a user interface of a labeling tool. In the second portion 150 of the IUI illustrated in FIG. 3, the indicator layer 300 may be displayed overlaid on a satellite layer 706 or a two-dimensional model layer 704 such that the building 302 at the position of the GCP indicator 306 may be visible. Returning to FIG. 7, the model layer 704 may be a two-dimensional or three-dimensional model layer. In an example embodiment, the model layer 704 is a three-dimensional model layer, and the indicator layer 708 comprises indicators positioned at various elevations corresponding to the elevations of the three-dimensional models of the model layer 704. For example, if a field-of-view indicator 714 has an indicator position at street-level and a GCP indicator 712 has an indicator position at the top of a building, the indicator layer 708 may define the two indicators at their respective elevations when the indicator layer 708 is displayed overlaid on a three-dimensional model layer 704. The field-of-view indicator 714 may be further defined with axes tilt along six degrees-of-freedom (6 DOF). For example, metadata associated with the corresponding perspective image may comprise a roll, pitch, and/or yaw angle of the image capture device 22 when capturing the perspective image. Alternatively or additionally, a roll, pitch, and yaw angle may be determined based on image processing and image analysis techniques on the perspective image, such as horizon identification. With roll, pitch, and yaw angles being defined, the field-of-view indicator 714 may be defined with such 6 DOF angles when displayed overlaid on a three-dimensional model layer 704. In various example embodiments, a three-dimensional model layer 704 may be ortho-rectified in order to provide an accurate overhead view.

The indicator layer 708 may alternatively or additionally be displayed overlaid a feature layer 702 in an example embodiment. The feature layer 702 may be another level of abstraction relative to the model layer 704 and satellite layer 706. For example, the feature layer 702 may only display abstract models of road networks or significant landmarks in the surroundings. In the example second portion 150 of an IUI illustrated in FIG. 3, the indicator layer 300 may be displayed overlaid on a feature layer 702 such that the building 302 is a significant landmark and visible. As with the model layer 704, the higher level of abstraction in the feature layer 702 conserves processing power when displaying in the user interface of a labeling tool.

In various embodiments, the layer of the digital map on which the indicator layer is displayed overlaid (or if the indicator layer is to be displayed overlaid on a layer of the digital map) may be determined based on various factors. In an example embodiment, a digital map layer is chosen for an indicator layer 708 to be displayed overlaid on based on the complexity of the indicator layer and the processing power of the user apparatus 10. For example, an indicator layer 708 that comprises a large plurality of field-of-view indicators 714, image indicators 716, and/or GCP indicators 712 may be displayed overlaid on a feature layer 702 to conserve processing power. In another example, the same indicator layer 708 with a large plurality of indicators may not be displayed overlaid on any digital map layers. In another example, an indicator layer 708 that only comprises one field-of-view indicator 714 and one GCP indicator 712 may be displayed overlaid on a satellite layer 706. In various example embodiments, a digital map layer may be chosen for an indicator layer 708 to be displayed overlaid on based on the task assigned to the user using the labeling tool. For example, if the user using the labeling tool is assigned to identify and label GCPs in ground source sensor data, or perspective images, then a satellite layer 706 may be chosen in order to provide the most detail in locating the GCP. In another example, if the user is tasked with feature correspondence and alignment of two sets of ground source sensor data, or two perspective images, then a feature layer 702 may be sufficient, as the user is primarily interested in the positions and poses of the perspective images in relation to each other. In an example embodiment, the indicator layer 708 may not be displayed overlaid on any digital map layers when the user is tasked with feature correspondence and alignment of two perspective images. In another example embodiment involving feature correspondence and alignment, the indicator layer 708 may be displayed overlaid directly on the two perspective images. In another example, the digital map layer on which the indicator layer is overlaid may be determined based on user preferences and/or user input received via the IUI of the labeling tool (e.g., via the user interface 18). In various example embodiments, more than one layer of the digital map may be selected based on at least processing power, contextual needs, or user preference.

In various example embodiments, displaying the indicator layer 708 overlaid on a digital map layer may comprise scaling the digital map layer and/or scaling the indicator layer 708 such that the relationship between real world distances and pixels that is used when defining the indicators in the indicator layer 708 is preserved in the indicator layer overlay. For example, it may be previously determined to equate a distance of 10 meters to 10 pixels when defining at least the field-of-view indicator 714, and therefore, the digital map layer on which the indicator layer 708 is displayed overlaid should be scaled so that a distance of 10 meters in the digital map layer is displayed to span 10 pixels. As such, accuracy of the indicators in the indicator layer 708 is preserved at a high level or high resolution.

Reference is now made to FIG. 4, which illustrates another example indicator layer overlay according to the present disclosure. The methods, apparatuses, and computer program products disclosed herein may cause display of an indicator layer 400 in a second portion 150 of the IUI of the labeling tool. As shown in FIG. 4, the indicator layer 400 may comprise a first image indicator 304, a second image indicator 404, a field-of-view indicator 408, and a GCP indicator 306. The first image indicator 304 may correspond to a first perspective image, whereas the second image indicator 404 and the field-of-view indicator 408 may correspond to a second perspective image. As mentioned, the first image indicator 304 may be defined to have an indicator position at and/or substantially equal to a first image position associated with the first perspective image. The second image indicator 404 may be defined to have an indicator position at and/or substantially equal to a second image position associated with the second perspective image. The indicator positions of the first and second image indicators 304, 404 may be defined in the indicator layer overlay 300 by determining or calculating a location in pixel space. For example, each pixel of the indicator layer overlay 400 being displayed in the second portion 150 of the IUI of the labeling tool may have a correspondence to a coordinate point (e.g., latitude and longitude) or a finely resolved/defined coordinate area, such that a first and second pixel of the indicator layer overlay 400 may respectively represent the first and second image positions and be respectively defined as the indicator positions of the first and second image indicators 304, 404. In FIG. 4, the first image indicator 304 has an indicator position at an East-West spanning road to the West of an intersection, and the second image indicator 404 has an indicator position at a North-South spanning road to the North of the same intersection. Thus, it may be clear to a user viewing the IUI of the labeling tool that the perspective images were captured on two different roads, whether the two were captured by two separate probe apparatuses on the two different roads or by the same probe apparatus at different times. For example, the first and second perspective images may have some field-of-view in common, but viewed from different perspectives. The first image indicator 304 and the second image indicator 404 may respectively comprise labels or identifiers to indicate each correspondence to a first and second perspective image. For example, FIG. 4 illustrates the first image indicator 304 comprising an "A" identifier and the second image indicator 404 comprising a "B" identifier, to suggest that the first image indicator 304 corresponds to a perspective image "A" or a first perspective image and the second image indicator 404 corresponds to a perspective image "B" or a second perspective image. As mentioned previously, the first and second image indicators 304, 404 may comprise labels or identifiers of different types, such as numbers if the first and second perspective images belong to a larger set of perspective images, for example.

The indicator layer 400 may comprise a field-of-view indicator 408. As illustrated in FIG. 4, the field-of-view indicator 408 may be defined to have an indicator position at and/or substantially equal to the second image position, also where the second image indicator 404 may be defined. Similarly, the indicator position of the field-of-view indicator 408 may be defined by determining or calculating a location in the pixel space of the indicator layer 400 corresponding to the second image position. As discussed previously in relation to FIG. 3, the field-of-view indicator 408 may similarly be defined to have an orientation corresponding to and/or substantially equal to the second image pose associated with the second perspective image. For example, FIG. 4 shows the field-of-view indicator 408 having an orientation towards the South corresponding to and/or substantially equal to the second image pose. This indication of image pose suggests to the user viewing the IUI of the labeling tool that the second perspective image may contain features located to the South of the second image position. The field-of-view indicator 408 may be customizable in the same manner as describe with the field-of-view indicator 308 in FIG. 3. With the field-of-view indicator 408 having the second image position and the second image pose and being associated with the second perspective image, the field-of-view indicator 408 may be referred to as a second field-of-view indicator 408, with the first field-of-view indicator being the field-of-view indicator 308 in FIG. 3 (and not displayed in FIG. 4) associated with a first perspective image.

The indicator layer 400 may be displayed with the second field-of-view indicator 408 based on, or responsive to, user interaction with the IUI of the labeling tool. In an example embodiment, the first field-of-view indicator 308 or the second field-of-view indicator 408 may be displayed in a second portion 150 of the IUI of the labeling tool based on the display of the first or the second perspective image in a first portion 100 of the IUI of the labeling tool (see FIGS. 12 and 13). For example, the first perspective image and the first field-of-view indicator 308 may be displayed by default, but a user may select, or input a command to, display the second perspective image in the first portion 100 of the IUI of the labeling tool, thus causing the second field-of-view indicator 408 to be displayed and the first field-of-view indicator 308 to stop being displayed, in an example embodiment. This dynamic updating of an indicator layer provides further context and richness of information without confusing the user by displaying non-corresponding information. In example embodiments, the first image indicator 304 may remain displayed while the first field-of-view indicator 308 is vanished, and likewise, the second image indicator 404 may remain displayed while the first field-of-view indicator 308 is displayed. That is, image indicators 304, 404 may remain displayed regardless of user interaction to remind the user of the relative image positions associated with the first and second perspective images. In an example embodiment, the user may directly select which field-of-view indicator is displayed without interacting with the first portion 100 of the IUI.

FIG. 4 further illustrates the indicator layer 400 comprising the GCP indicator 306, which may be substantially similar and similarly defined and displayed as the GCP indicator 306 in FIG. 3. Additionally, the indicator layer 400 is displayed overlaid on at least one digital map layer, such that roads, buildings 302, and trees 312 are displayed, in a similar manner to which the indicator layer 300 is displayed overlaid at least one digital map layer in FIG. 3. Overall, the indicator layer 400 may be substantially similar to the indicator layer 300; the indicator layer 400 demonstrates an example embodiment displaying a field-of-view indicator while receiving more than one perspective image.

Referring now to FIG. 5, another example indicator layer overlay according to the present disclosure is provided. The methods, apparatuses, and computer program products disclosed herein may cause display of an indicator layer 500 in a second portion 150 of the IUI of the labeling tool. As shown in FIG. 5, the indicator layer 500 may comprise first and second image indicators 304, 404, first and second field-of-view indicators 308, 408, and a GCP indicator 306. Like the example embodiment illustrated in FIG. 4, at least two perspective images are indicated to a user viewing the IUI of the labeling tool by the two image indicators 304, 404, accordingly identified with "A" and "B", respectively. FIG. 5 however illustrates an example embodiment where each perspective image of the two perspective images have a field-of-view indicator associated. For example, the indicator layer 500 comprises both the first field-of-view indicator 308 and the second field-of-view indicator 408 to illustrate to a user both the first image pose and the second image pose. The indicator layer 500 may be useful and desired for at least both of the user tasks described herein, the two being the GCP identification/labeling and the feature correspondence/alignment. For example, a user may be tasked with identifying a GCP in two perspective images and may turn to an example embodiment with indicator layer 500 to quickly acquire context as to the location of the GCP relative to the approximate fields-of-view of the two perspective images. Thus, the indicator layer 500 may allow quicker contextual understanding as opposed to indicator layer 400, which may only display one field-of-view indicator at a time. However, in an example embodiment, a maximum number of field-of-view indicators that may be provided by an indicator layer may be defined so as to avoid the indicator layer from becoming overly visually cluttered. In another example, a user may be tasked with aligning two perspective images and identifying corresponding features present in both perspective images. In such an example, the indicator layer 500 would again be helpful for a user to understand the relative image poses of the two perspective images, while also potentially identifying a GCP or other significant features positioned in both approximate fields-of-view.

In various example embodiments, indicator layer 500 may be displayed in a second portion 150 of the IUI of the labeling tool, while both of the perspective images corresponding to the two field-of-view indicators are displayed in a first portion 100 of the IUI of the labeling tool. It follows that in such example embodiments, more than two perspective images may be displayed in a first portion of the labeling tool user interface if the indicator layer 500 comprises more than two field-of-view indicators. In other example embodiments, only one perspective image may be displayed in a first portion of the labeling tool user interface possibly due to size or space restrictions, also allowing the user to switch between the display of various perspective images while the indicator layer 500 comprising more than one field-of-view indicator is displayed in a second portion of the labeling tool user interface.

Referring now to FIG. 6, another example indicator layer overlay according to the present disclosure is provided. The methods, apparatuses, and computer program products disclosed herein may cause display of an indicator layer 600 in a second portion 150 of the IUI of the labeling tool. The indicator layer 600 may comprise two image indicators 304, 404, and two field-of-view indicators 308, 408. As should be clear from the present disclosure thus far, the first image indicator 304 and the first field-of-view indicator 308 may correspond to a first perspective image, and the second image indicator 404 and the second field-of-view indicator 408 may correspond to a second perspective image. The indicator layer 600 may not define nor display a GCP indicator 306, possibly due to at least not receiving GCP information, not deeming GCP information necessary for the task at hand, or based on user control. For example, the indicator layer 600 may be particularly useful and desired in feature correspondence and image alignment tasks. Feature correspondence and image alignment tasks require the identification of significant and/or stable features present in multiple sets of data and alignment of said sets of data and specifically said significant and/or stable features. For example, FIG. 6 illustrates an example embodiment of an indicator layer 600 that may assist a user in aligning two perspective images. By seeing the two field-of-view indicators 308, 408, the user may quickly orient themself in the environment and understand the approximate fields-of-view of the two perspective images. As the relative image poses are the primary information of interest in such tasks, example embodiments may not overlay the indicator layer 600 on a digital map layer to reduce visual clutter and/or reduce use of processing power. However, other example embodiments may still display the indicator layer 600 overlaid on a digital map layer in complex environments or upon user request. For example, displaying the indicator layer 600 overlaid a three-dimensional model layer or a satellite layer may be particularly useful in situations where the perspective images were captured at two different elevations.

In various example embodiments, the IUI of the labeling tool may provide an alert if there is an overlap between the two field-of-view indicators 308, 408 in the indicator layer 600. Such an alert is beneficial to a user by indicating that there is some overlap in the approximate fields-of-view of the two perspective images, or more specifically, that there may be features present in both perspective images. For example, the alert may be generated when one of the two lines of the first field-of-view indicator 308 overlaps or intersects with one of the two lines of the second field-ofview indicator 408. In other example embodiments, the alert may also be generated if the two image indicators 304, 404 are within a predetermined distance from each other.

Referring now to FIG. 8, a flowchart is provided to illustrate a method 800 for providing an indicator layer overlay according to an example embodiment. The method 800 may be directly applicable, and possibly preferred, in example embodiments where a user is tasked with GCP identification and labeling tasks. The method 800 may provide an indicator layer overlay that assists the user in understanding the relative positions and pose of a perspective image and a GCP. As mentioned, GCP identification and labeling tasks require the identification of the GCP in the perspective image, such as by identifying and labeling specific pixels of the perspective image corresponding to the GCP. Thus, the method 800 may provide an indicator layer overlay that may assist a user in quickly orienting themselves in the environment and understand the approximate field-of-view of the perspective image and the position of the GCP.

Starting at block 802, metadata associated with a perspective image comprising an image position and an image pose may be received and/or accessed, wherein the perspective image may be captured by an image capture device 22 located at the image position and having the image pose. For example, the user apparatus 10 may comprise means, such as processor 12, memory 14, communication interface 16, user interface 18, and/or the like, for receiving metadata associated with a perspective image. Receiving and/or accessing metadata associated with a perspective image may be responsive to some user interaction in the IUI of the labeling tool. For example, the method 800 for providing an indicator layer overlay may be initiated responsive to a user selecting a perspective image for display in the IUI of the labeling tool. In another example, a user may specifically request that an indicator layer overlay be provided (e.g., through method 800) if the user is having difficulty identifying the GCP (or pixels corresponding to the GCP) in the perspective image. In various example embodiments, an indicator layer overlay may be provided (e.g., through method 800) automatically or without user input when a GCP identification/labeling task is assigned.

In an example embodiment, the metadata comprising an image position and an image pose also comprises a pixel location of an indicator layer that corresponds to the image position and an orientation in the pixel space of the indicator layer that corresponds to the image pose. In various example embodiments, a software library may be accessed in order to determine, with at least the received metadata as input, a pixel location and an orientation in pixel space that respectively correspond to the image position and the image pose. In an example embodiment, a software library may be accessed in order to determine a scale factor between pixels and real world distances. In an example embodiment, the metadata associated with the perspective image is accessed from a database (e.g., stored by memory 14), received via communication interface 16, and/or the like. In example embodiments, receiving metadata associated with a perspective image also comprises receiving the perspective image itself. Metadata associated with a perspective image may further include information/data concerning the properties or characteristics of the perspective image, such as focal depth, field-of-view, and/or the like. In example embodiments, receiving metadata associated with a perspective image may comprise performing image processing or image analysis on the perspective image to calculate or determine metadata such as focal depth and field-of-view. Metadata associated with the perspective image may further indicate whether the perspective image may be one of a plurality or series of perspective images, for example an indication that the perspective image is the first out of a series of ten perspective images. In various example embodiments, metadata associated with a perspective image may further include information/data concerning the properties, configuration, and/or specification of the image capture device 22 that captured the perspective image. For example, metadata may include a zoom factor of the image capture device 22, field-of-view angle of the lens of the image capture device 22, and/or the like.

Continuing with FIG. 8, at block 804, a field-of-view indicator may be defined. For example, a field-of-view indicator may be an element of an indicator layer and/or IUI display element that is defined by an indicator position, an indicator pose, an angle between the lines or arms of the field-of-view indicator, and a length of the lines or arms of the field-of-view indicator. For example, a field-of-view indicator having an indicator position located at the image position and having the image pose may be defined. For example, the indicator position may be defined based on the image position and/or defined to be substantially equal to the image position. The indicator pose may be defined based on the image pose and/or defined to be substantially equal to the image pose. For example, the angle between the lines or arms of the field-of-view indicator may be defined based on a known or approximated field-of-view of the image capture device 22 that captured the perspective image, an analysis of the perspective image, and/or the like. For example, the length of the lines or arms of the field-of-view indicator may be configurable based on, for example, user input and/or user preferences, an analysis of the perspective image, based on a characteristic of the IUI of the labeling tool, set in the application and/or program code of the labeling tool, and/or the like. For example, the user apparatus 10 may comprise means, such as processor 12, memory 14, communication interface 16, and/or the like, for defining a field-of-view indicator.

As discussed previously, the field-of-view indicator may be a configurable representation of an approximate field-of-view of the perspective image. As such, defining the field-of-view indicator may comprise requesting and receiving user input for various configurable parameters or characteristics such as size, shape, angle, length, and/or the like. In an example embodiment, defining the field-of-view indicator may comprise accessing user preferences from a user profile, and/or the like. In various example embodiments, defining may further comprise defining a first image indicator having the indicator position at and/or substantially equal to the image position. In various example embodiments, defining may further comprise determining a location in the pixel space of an indicator layer corresponding to the image position. For example, FIG. 3 illustrates a field-of-view indicator 308 defined at an image position, as well as an image indicator 304 also defined at the same image position.

At block 806, ground control point (GCP) information may be received, wherein the GCP information may comprise a GCP position based at least in part on a location of the GCP. For example, the user apparatus 10 may comprise means, such as processor 12, memory 14, communication interface 16, user interface 18, and/or the like, for receiving GCP information. For example, a plurality of GCP information may be stored in a database in a server and selectively transmitted through a network 8 to be received by the user apparatus 10. In another example, the GCP information may be accessed from a database stored in memory 14. In various example embodiments, receiving GCP information may first comprise determining relevant GCPs within a predetermined distance from the image position, or the GCP closest to the image position, out of a list of GCPs for which there is information. For example, a database storing GCP information may be queried to identify one or more relevant GCPs. In various embodiments, a relevant GCP is a GCP that is within a threshold distance of the image position and/or expected to be within the field-of-view of the perspective image. Receiving the GCP information may then comprise requesting corresponding GCP information from a database or a server. In an example embodiment, the GCP information also comprises a pixel location of an indicator layer that corresponds to the GCP position. In various example embodiments, a software library may be accessed in order to determine, with at least the received GCP information as input, a pixel location that corresponds to the GCP position.

The GCP information may be considered as ground truth data or at least known to be more accurate than data collected by a probe apparatus 20. For example, the GCP information may be survey data independently surveyed, collected, and verified. In an example embodiment, the GCP information may further comprise a plurality of control images, with the GCP being visible in each of the plurality of control images. The plurality of control images may also be displayed in the first portion, or another portion, of the IUI of the labeling tool. In various example embodiments, metadata associated with each of the plurality of control images may also be received with the GCP information, and field-of-view indicators may be defined and/or displayed for one or more of the plurality of control images.

At block 808, a GCP indicator may be defined. In an example embodiment, defining a GCP indicator comprises defining a second indicator position. For example, the GCP indicator may be defined by defining a second indicator position located at, based on, and/or substantially equal to the GCP position. In various example embodiments, defining the GCP indicator may comprise determining a location in the pixel space of an indicator layer corresponding to the GCP position. For example, the user apparatus 10 may comprise means, such as processor 12, memory 14, communication interface 16, user interface 18, and/or the like, for defining a GCP indicator. As previously mentioned, the GCP indicator may be configurable, and thus, defining the GCP indicator may comprise requesting and receiving user input on configurable parameters or characteristics of the GCP indicator, or accessing user preferences from a user profile.

At block 810, display of an indicator layer comprising the field-of-view indicator and the GCP indicator in a second portion 150 of an IUI of a labeling tool may be caused, wherein at least the perspective image is displayed in a first portion 100 of the IUI of the labeling tool and the labeling tool is provided via output circuitry of the user interface 18 of the user apparatus 10. For example, an indicator layer may be rendered based on the defined image indicator(s), field-of-view indicator(s), and/or GCP indicator. The processor 12 of the user apparatus 10 may then cause the rendered indicator layer to be displayed via the user interface 18. For example, the user apparatus 10 may comprise means, such as processor 12, memory 14, communication interface 16, user interface 18, and/or the like for causing display of an indicator layer in the IUI of the labeling tool. The interactive user interface (IUI) of a labeling tool may comprise multiple portions, where each portion may be a separate Graphical User Interface (GUI) window. Accordingly, at least the perspective image may be displayed in one window (e.g., a first portion 100 of the IUI) and the indicator layer may be displayed in a second window (e.g., a second portion 150 of the IUI). In other various example embodiments, the user interface comprises one window divided into portions (e.g., the first portion 100 and the second portion 150). For example, the perspective image may be displayed in one half of a window (e.g., a first portion 100) with the indicator layer being displayed on the other half of the same window (e.g., a second portion 150), as shown for example in FIG. 12. In an example embodiment, various other overlays may be displayed over the perspective image, such as features or edges detected through image processing and image analysis techniques. The IUI may further have portions allowing for user interaction, such as allowing a user to configure parameters relating to the field-of-view indicator or GCP indicator or allowing a user to interact with the various displayed overlays directly. As mentioned previously, other information may be displayed in the first portion 100 (or other portions) of the labeling tool IUI such as the plurality of GCP control images. In various example embodiments, causing display of an indicator layer may comprise displaying the indicator layer overlaid on one or more digital map layers, as shown and described with FIG. 7. For example, FIG. 3 illustrates an example indicator layer overlay that may be provided as a result of the method 800.

Referring now to FIG. 9A, a method 900 is diagrammed. In example embodiments, the method 900 may begin and take place at least after the start of method 800. At block 902, metadata associated with a second perspective image is received, wherein the metadata associated with the second perspective image comprises a second image position and a second image pose. For example, the user apparatus 10 may comprise means, such as processor 12, memory 14, communications interface 16, user interface 18, and/or the like, for receiving and/or accessing metadata associated with a second perspective image. In various example embodiments, the metadata associated with the second perspective image may be substantially similar to the metadata associated with the first perspective image, received in block 802 of method 800. For example, the metadata associated with the second perspective image may include an image position and/or image pose associated with the second perspective image; information/data concerning the properties or characteristics of the perspective image, such as focal depth and/or field-of-view; and/or the like. The metadata associated with the first perspective image and the metadata associated with the second perspective image may further comprise data such as an image capture device 22 identifier or probe apparatus 20 identifier to inform a user whether the two perspective images were captured by the same image capture device 22, possibly at different times, or by two different image capture devices 22. In an example embodiment, the metadata associated with the second perspective image comprises a pixel location of an indicator layer that corresponds to the second image position and an orientation in the pixel space of the indicator layer that corresponds to the second image pose. In various example embodiments, a software library may be accessed in order to determine, with at least the received metadata as input, a pixel location and an orientation in pixel space that respectively correspond to the second image position and the second image pose. In an example embodiment, a software library may be accessed in order to determine a scale factor between pixels and real world distances.

At block 904, a second image indicator may be defined having a third indicator position located at and/or substantially equal to the second image position. For example, the user apparatus 10 may comprise means, such as processor 12, memory 14, communications interface 16, user interface 18, and/or the like, for defining a second image indicator. In various example embodiments, defining the second image indicator may comprise defining a label or identifier associated with the second image indicator to indicate the correspondence with the second perspective image and differentiate it from a first image indicator. In various example embodiments, defining the second image indicator may further comprise determining a location in the pixel space of an indicator layer corresponding to the second image position.

At block 906, display of the second image indicator in the second portion of the IUI of the labeling tool may be caused. For example, an indicator layer may be rendered based on the defined image indicator(s), field-of-view indicator(s), and/or GCP indicator. The processor 12 of the user apparatus 10 may then cause the rendered indicator layer to be displayed via the user interface 18. For example, the user apparatus 10 may comprise means, such as processor 12, memory 14, communications interface 16, user interface 18, and/or the like, for causing display of the second image indicator. In various example embodiments, the second image indicator may be defined and displayed with the indicator layer comprising the field-of-view indicator and the GCP indicator in block 810. In various example embodiments, the second image indicator may be displayed after and overlaid on the existing indicator layer. For example, the second image indicator may be defined in its own second indicator layer, and the second indicator layer is displayed over (e.g., displayed overlaid on) the existing first indicator layer.

Overall, the method 900 allows the display of additional context in the labeling tool for the user. The display of a second image indicator may give information on a second perspective image while the user is viewing the first perspective image in the first portion 100 of the IUI of the labeling tool. Furthermore, the method 900 may be executed iteratively for a second perspective image, a third, a fourth, and so on, resulting in defining a second image indicator, a third image indicator, a fourth image indicator, and so on, resulting in a plurality of image indicators being displayed in an indicator layer overlay in the second portion 150 of the IUI of the labeling tool. For example, the first perspective image from method 800 may belong to a dataset of a number of perspective images, each of which may be associated with an iteration of method 900.

Reference is now made to FIG. 9B, where a method 950 is provided. The method 950 may be executed after the execution of the method 900. At block 952, a second field-of-view indicator is defined to have the third indicator position located at and/or substantially equal to the second image position and to have the second image pose. For example, the user apparatus 10 may comprise means, such as processor 12, memory 14, communications interface 16, user interface 18, and/or the like, for defining the second field-of-view indicator. Similar to the first field-of-view indicator defined in block 804 and associated with the first perspective image, the second field-of-view indicator may be a configurable representation of an approximate field-of-view of the second perspective image. In various example embodiments, the second field-of-view indicator may be defined in the same indicator layer as the first field-of-view indicator, and/or the same indicator layer as the second image indicator.

At block 954, a first image indicator having the first indicator position located at and/or substantially equal to the image position may be defined. In various example embodiments, the first image indicator may have already been defined in block 804 with the first field-of-view indicator. In other example embodiments, the first image indicator is defined only in method 950 when a second perspective image is involved. For example, the user apparatus 10 may comprise means, such as processor 12, memory 14, communications interface 16, user interface 18, and/or the like, for defining a first image indicator. In various example embodiments, defining the first image indicator may comprise defining a label or identifier associated with the first image indicator to indicate the correspondence with the first perspective image and differentiate it from a second image indicator. In various example embodiments, defining the first image indicator may further comprise determining a location in the pixel space of an indicator layer corresponding to the first image position.

At decision block 956, user interaction with input circuitry of the user apparatus 10 may or may not be detected. For example, the user apparatus 10 may comprise means, such as processor 12, memory 14, communications interface 16, user interface 18, and/or the like, for detecting user interaction. In various example embodiments, user interaction may be the user selecting display of the second perspective image. For example, the IUI of the labeling tool may comprise one or more selectable display elements 182 (e.g., possibly in the first portion 100, the second portion 150, or a third portion 180 of the IUI), as shown in FIG. 12. The selectable display elements 182 may be configured such that user interaction (e.g., via input circuitry of the user interface 18) with one or more of the selectable display elements 182 causes and/or triggers selection of a particular perspective image. In an example embodiment, an image indicator displayed in the second portion 150 of the IUI may be a selectable display element 182. For example, a user may interact directly with the second image indicator displayed in the second portion 150 of the IUI as an indication that the user would like to cause the second field-of-view indicator to be displayed. In another example, the user may interact with the first image indicator and/or the first field-of-view indicator displayed in the second portion 150 of the IUI as an indication that the user would like to cause the display of the first field-of-view indicator to be halted. As illustrated in the flowchart of FIG. 9B, a detection of user interaction will lead to block 958. On the other hand, a detection that user interaction has not happened or the lack of user interaction detection will lead back to decision block 956 for reevaluation or re-polling. In other example embodiments, a detection that user interaction has not happened or the lack of a detection thereof may cause the method 950 to conclude or quit. In other example embodiments, a detection that user interaction has not happened or the lack of a detection thereof may cause re-polling of decision block 956 for a predetermined amount of time or a predetermined amount of iterations before causing the method 950 to conclude or quit.

At block 958, display of a second indicator layer comprising the second field-of-view indicator, the first image indicator, and the GCP indicator via the second portion of the IUI of the labeling tool is caused. For example, a second indicator layer may be rendered based on the defined image indicator(s), field-of-view indicator(s), and/or GCP indicator. The processor 12 of the user apparatus 10 may then cause the rendered indicator layer to be displayed via the user interface 18. For example, the user apparatus 10 may comprise means, such as processor 12, memory 14, communications interface 16, user interface 18, and/or the like, for causing display of the second indicator layer. In various example embodiments, causing display of the second indicator layer may comprise displaying the second indicator layer overlaid on a first indicator layer or a digital map layer. In other example embodiments, causing display of the second indicator layer may first comprise halting display of the first indicator layer displayed at block 810 and/or rendering and displaying a modified first indicator layer. FIG. 4 illustrates an example indicator layer overlay provided as a result of the methods 800, 900, and 950.

Reference is now made to FIG. 10, where another method 1000 is provided. The method 1000 may be directly applicable, and possibly preferred, in example embodiments where a user is tasked with feature correspondence and image alignment tasks. The method 1000 may provide an indicator layer overlay that assists the user in understanding the relative positions and the poses of two perspective images. As mentioned, feature correspondence and image alignment tasks require the identification of significant and/or stable features present in multiple sets of data and alignment of said sets of data and specifically said significant and/or stable features. Thus, the method 1000 may provide an indicator layer overlay that may assist a user in quickly orienting themselves in the environment and understanding the approximate fields-of-view of two perspective images.

Starting at block 1002, metadata associated with a first perspective image comprising a first image position and a first image pose is received, wherein the first perspective image was captured by a first image capture device located at the first image position and having the first image pose. For example, the user apparatus 10 may comprise means, such as processor 12, memory 14, communications interface 16, user interface 18, and/or the like, for receiving metadata associated with a first perspective image. Receiving and/or accessing metadata associated with a first perspective image may be responsive to some user interaction in the IUI of the labeling tool. For example, a user may specifically request that an indicator layer overlay be provided (e.g., through method 1000) if the user is having difficulty orienting themselves in the environment of the two perspective images and understanding the approximate fields-of-view of the two perspective images.

In an example embodiment, the metadata associated with a first perspective image also comprises a pixel location of an indicator layer that corresponds to the first image position and an orientation in the pixel space of the indicator layer that corresponds to the first image pose. In various example embodiments, a software library may be accessed in order to determine, with at least the received metadata as input, a pixel location and an orientation in pixel space that respectively correspond to the first image position and the first image pose. In an example embodiment, the metadata associated with the first perspective image is accessed from a database (e.g., stored by memory 14), received via communication interface 16, and/or the like. In example embodiments, receiving metadata associated with the first perspective image also comprises receiving the first perspective image itself. Metadata associated with the first perspective image may further include information/data concerning the properties or characteristics of the first perspective image, such as focal depth, field-of-view, and/or the like. In example embodiments, receiving metadata associated with the first perspective image may comprise performing image processing or image analysis on the perspective image to calculate or determine metadata such as focal depth and field-of-view. In various example embodiments, metadata associated with the first perspective image may further include information/data concerning the properties, configuration, and/or specification of the image capture device 22 that captured the first perspective image. For example, metadata may include a zoom factor of the image capture device 22, field-of-view angle of the lens of the image capture device 22, and/or the like.

At block 1004, a first field-of-view indicator having a first indicator position located at and/or substantially equal to the first image position and having the first image pose may be defined. For example, the user apparatus 10 may comprise means, such as processor 12, memory 14, communications interface 16, user interface 18, and/or the like, for defining a first field-of-view indicator. For example, the first field-of-view indicator may be an element of an indicator layer and/or IUI display element that is defined by a first indicator position, a first indicator pose, an angle between the lines or arms of the first field-of-view indicator, and a length of the lines or arms of the first field-of-view indicator. For example, the first indicator position may be defined based on the first image position and/or defined to be substantially equal to the first image position. The first indicator pose may be defined based on the first image pose and/or defined to be substantially equal to the first image pose. For example, the angle between the lines or arms of the first field-of-view indicator may be defined based on a known or approximated field-of-view of the image capture device 22 that captured the first perspective image, an analysis of the first perspective image, and/or the like. For example, the length of the lines or arms of the first field-of-view indicator may be configurable based on, for example, user input and/or user preferences, an analysis of the first perspective image, based on a characteristic of the IUI of the labeling tool, set in the application and/or program code of the labeling tool, and/or the like. Defining the first field-of-view indicator may comprise requesting and receiving user input for various configurable parameters or characteristics such as size, shape, angle, length, and/or the like. In an example embodiment, defining the first field-of-view indicator may comprise accessing user preferences from a user profile, and/or the like. In various example embodiments, defining may further comprise defining a first image indicator having the indicator position at and/or substantially equal to the first image position. In various example embodiments, defining may further comprise determining a location in the pixel space of an indicator layer corresponding to the first image position. For example, FIG. 6 illustrates a first field-of-view indicator 308 defined at a first image position, as well as a first image indicator 304 also defined at the same image position.

At block 1006, metadata associated with a second perspective image comprising a second image position and a second image pose may be received, wherein the second perspective image was captured by a second image capture device located at the second image position and having the second image pose. For example, the user apparatus 10 may comprise means, such as processor 12, memory 14, communications interface 16, user interface 18, and/or the like, for receiving metadata associated with a second perspective image. In an example embodiment, the metadata associated with a second perspective image also comprises a pixel location of an indicator layer that corresponds to the second image position and an orientation in the pixel space of the indicator layer that corresponds to the second image pose. In various example embodiments, a software library may be accessed in order to determine, with at least the received metadata as input, a pixel location and an orientation in pixel space that respectively correspond to the second image position and the second image pose. In an example embodiment, the metadata associated with the second perspective image is accessed from a database (e.g., stored by memory 14), received via communication interface 16, and/or the like. In example embodiments, receiving metadata associated with the second perspective image also comprises receiving the second perspective image itself. Metadata associated with second perspective image may further include information/data concerning the properties or characteristics of the second perspective image, such as focal depth, field-of-view, and/or the like. In example embodiments, receiving metadata associated with the second perspective image may comprise performing image processing or image analysis on the perspective image to calculate or determine metadata such as focal depth and field-of-view. In various example embodiments, metadata associated with the second perspective image may further include information/data concerning the properties, configuration, and/or specification of the image capture device 22 that captured the second perspective image. For example, metadata may include a zoom factor of the image capture device 22, field-of-view angle of the lens of the image capture device 22, and/or the like.

At block 1008, a second field-of-view indicator may be defined to have a second indicator position located at and/or substantially equal to the second image position and to have the second image pose. For example, the user apparatus 10 may comprise means, such as processor 12, memory 14, communications interface 16, user interface 18, and/or the like, for defining a second field-of-view indicator. For example, the second field-of-view indicator may be an element of an indicator layer and/or IUI display element that is defined by a second indicator position, a second indicator pose, an angle between the lines or arms of the second field-of-view indicator, and a length of the lines or arms of the second field-of-view indicator. For example, the second indicator position may be defined based on the second image position and/or defined to be substantially equal to the second image position. The second indicator pose may be defined based on the second image pose and/or defined to be substantially equal to the second image pose. For example, the angle between the lines or arms of the second field-of-view indicator may be defined based on a known or approximated field-of-view of the image capture device 22 that captured the second perspective image, an analysis of the second perspective image, and/or the like. For example, the length of the lines or arms of the second field-of-view indicator may be configurable based on, for example, user input and/or user preferences, an analysis of the second perspective image, based on a characteristic of the IUI of the labeling tool, set in the application and/or program code of the labeling tool, and/or the like. Defining the second field-of-view indicator may comprise requesting and receiving user input for various configurable parameters or characteristics such as size, shape, angle, length, and/or the like. In an example embodiment, defining the second field-of-view indicator may comprise accessing user preferences from a user profile, and/or the like. In various example embodiments, defining may further comprise defining a second image indicator having the second indicator position at and/or substantially equal to the second image position. In various example embodiments, defining may further comprise determining a location in the pixel space of an indicator layer corresponding to the second image position. For example, FIG. 6 illustrates a second field-of-view indicator 408 defined at a second image position, as well as an image indicator 404 also defined at the same image position.

At block 1010, display of an indicator layer comprising the first field-of-view indicator and the second field-of-view indicator in a second portion of a user interface of a labeling tool may be caused, wherein at least one of the first perspective image or the second perspective image are displayed in a first portion of the IUI of the labeling tool and the labeling tool is provided via output circuitry of the user apparatus. For example, an indicator layer may be rendered based on the defined image indicator(s), field-of-view indicator(s), and/or GCP indicator. The processor 12 of the user apparatus 10 may then cause the rendered indicator layer to be displayed via the user interface 18. For example, the user apparatus 10 may comprise means, such as processor 12, memory 14, communications interface 16, user interface 18, and/or the like, for causing display of the indicator layer. The interactive user interface (IUI) of a labeling tool may comprise multiple portions, where each portion may be a separate Graphical User Interface (GUI) window. Accordingly, at least one of the two perspective images may be displayed in one window (e.g., a first portion 100 of the IUI) and the indicator layer may be displayed in a second window (e.g., a second portion 150 of the IUI). In other various example embodiments, the interactive user interface comprises one window divided into portions (e.g., the first portion 100 and the second portion 150). For example, at least one perspective image may be displayed in one half of a window (e.g., a first portion 100) with the indicator layer being displayed on the other half of the same window (e.g., a second portion 150), as shown for example in FIG. 13. In various example embodiments, both the first perspective image and the second perspective image are displayed. In other example embodiments, only one of the first and second perspective images is displayed, and the user may toggle between display of the first or second perspective image. In an example embodiment, various other overlays may be displayed over at least one perspective image, such as features or edges detected through image processing and image analysis techniques. The IUI may further have portions allowing for user interaction, such as allowing a user to configure parameters relating to the first and/or second field-of-view indicators or allowing a user to interact with the various displayed overlays directly. In various example embodiments, causing display of an indicator layer may comprise displaying the indicator layer overlaid on one or more digital map layers, as shown and described with FIG. 7. For example, FIG. 6 illustrates an example indicator layer overlay that may be provided as a result of the method 1000.

Reference is now made to FIG. 11, where another method 1100 is provided. The method 1100 may also be directly applicable, and possibly preferred, in example embodiments where a user is tasked with feature correspondence and image alignment tasks. The method 1000 may provide an indicator layer overlay that assists the user in understanding the relative positions and the poses of a plurality of perspective images. As mentioned, feature correspondence and image alignment tasks require the identification of significant and/or stable features present in multiple sets of data and alignment of said sets of data and specifically said significant and/or stable features. Thus, the method 1100 may provide an indicator layer overlay that may assist a user in quickly orienting themselves in the environment and understand the approximate fields-of-view of a plurality of perspective images.

Starting at block 1102, metadata associated with a plurality of perspective images may be received, wherein the metadata comprises a plurality of image positions and a plurality of image poses, each of the plurality of perspective images corresponding to one of the plurality of image positions and one of the plurality of image poses. For example, the user apparatus 10 may comprise means, such as processor 12, memory 14, communications interface 16, user interface 18, and/or the like, for receiving metadata associated with a plurality of perspective images. Receiving and/or accessing metadata associated with a plurality of perspective images may be responsive to some user interaction in the IUI of the labeling tool. For example, a user may specifically request that an indicator layer overlay be provided (e.g., through method 1100) if the user is having difficulty orienting themselves in the environment of the plurality of perspective images and understanding the approximate fields-of-view of the plurality of perspective images.

In an example embodiment, the metadata associated with a plurality of perspective images also comprises a plurality of pixel locations of an indicator layer that correspond to the plurality of image positions and a plurality of orientations in the pixel space of the indicator layer that correspond to the plurality of image poses. In various example embodiments, a software library may be accessed in order to determine, with at least the received metadata as input, a plurality of pixel locations and a plurality of orientations in pixel space that respectively correspond to the plurality of image positions and the plurality of image poses. In an example embodiment, the metadata associated with the plurality of perspective images is accessed from a database (e.g., stored by memory 14), received via communication interface 16, and/or the like. In example embodiments, receiving metadata associated with the plurality of perspective images also comprises receiving the plurality of perspective images. Metadata associated with the plurality of perspective images may further include information/data concerning the properties or characteristics of each perspective image, such as focal depth, field-of-view, and/or the like. In example embodiments, receiving metadata associated with the plurality of perspective images may comprise performing image processing or image analysis on each perspective image to calculate or determine metadata such as focal depth and field-of-view. In various example embodiments, metadata associated with the plurality of perspective images may further include information/data concerning the properties, configuration, and/or specification of the image capture device 22 that captured each perspective image. For example, metadata may include a zoom factor of the image capture device 22, field-of-view angle of the lens of the image capture device 22, and/or the like.

At block 1104, a plurality of field-of-view indicators may be defined, each field-of-view indicator being associated with a corresponding perspective image of the plurality of perspective images, having the corresponding image position and the corresponding image pose, and providing an indication of a field-of-view of an image capture device that captured the corresponding perspective image. For example, the user apparatus 10 may comprise means, such as processor 12, memory 14, communications interface 16, user interface 18, and/or the like, for defining a plurality of field-of-view indicators. For example, each field-of-view indicator may be an element of an indicator layer and/or IUI display element that is defined by an indicator position, an indicator pose, an angle between the lines or arms of each field-of-view indicator, and a length of the lines or arms of each field-of-view indicator. For example, each indicator position may be defined based on an image position and/or defined to be substantially equal to an image position. Each indicator pose may be defined based on an image pose and/or defined to be substantially equal to an image pose. For example, the angle between the lines or arms of each field-of-view indicator may be defined based on a known or approximated field-of-view of the image capture device 22 that captured each perspective image, an analysis of each perspective image, and/or the like. For example, the length of the lines or arms of each field-of-view indicator may be configurable based on, for example, user input and/or user preferences, an analysis of each perspective image, based on a characteristic of the IUI of the labeling tool, set in the application and/or program code of the labeling tool, and/or the like. Defining the plurality of field-of-view indicators may comprise requesting and receiving user input for various configurable parameters or characteristics such as size, shape, angle, length, and/or the like. In an example embodiment, defining the plurality of field-of-view indicators may comprise accessing user preferences from a user profile, and/or the like. In various example embodiments, defining may further comprise defining a plurality of image indicators having indicator positions at and/or substantially equal to an image position.

At block 1106, an indicator layer comprising the plurality of field-of-view indicators may be generated. For example, the user apparatus 10 may comprise means, such as processor 12, memory 14, communications interface 16, user interface 18, and/or the like, generating an indicator layer comprising the plurality of field-of-view indicators. For example, an indicator layer may be generated or rendered based on the defined image indicator(s), field-of-view indicator(s), and/or GCP indicator. In various example embodiments, generating an indicator layer may comprise accessing a software library to convert defined indicators into pixel form, allocate various portions of pixel space, reference a scale factor between pixels and real world distances, and/or assign specific values (e.g., a hex code, RGB code, CMYK code, or other color code value) to specific pixels.

At block 1108, display of the indicator layer comprising the plurality of field-of-view indicators in a second portion of a user interface of a labeling tool may be caused, wherein the plurality of perspective images are displayed in a first portion of the IUI of the labeling tool and the labeling tool is provided via output circuitry of the user apparatus. For example, an indicator layer may be rendered based on the defined image indicator(s), field-of-view indicator(s), and/or GCP indicator. The processor 12 of the user apparatus 10 may then cause the rendered indicator layer to be displayed via the user interface 18. For example, the user apparatus 10 may comprise means, such as processor 12, memory 14, communications interface 16, user interface 18, and/or the like, causing display of the indicator layer. The interactive user interface (IUI) of a labeling tool may comprise multiple portions, where each portion may be a separate Graphical User Interface (GUI) window. Accordingly, the plurality of perspective images may be displayed in one window (e.g., a first portion 100 of the IUI) and the indicator layer may be displayed in a second window (e.g., a second portion 150 of the IUI). In other various example embodiments, the interactive user interface comprises one window divided into portions (e.g., the first portion 100 and the second portion 150). For example, the plurality of perspective images may be displayed in one half of a window (e.g., a first portion 100) with the indicator layer being displayed on the other half of the same window (e.g., a second portion 150). In example embodiments, only one of the plurality of perspective images is displayed, and the user may toggle between display of a perspective image of the plurality of perspective images. In an example embodiment, various other overlays may be displayed over the plurality of perspective images, such as features or edges detected through image processing and image analysis techniques. The IUI may further have portions allowing for user interaction, such as allowing a user to configure parameters relating to the plurality of field-of-view indicators or allowing a user to interact with the various displayed overlays directly. In various example embodiments, causing display of an indicator layer may comprise displaying the indicator layer overlaid on one or more digital map layers, as shown and described with FIG. 7.

The present disclosure provides a number of technical advantages, as described below. As previously mentioned, highly accurate digital maps and feature layers of digital maps are important for automated and/or assisted driving as well as other applications. GNSS positioning, for example, under best case scenario conditions may determine a location with considerable uncertainty. For example, the global average user range error for GPS in clear skies is required to be no more than 7.8 meters with a 95% probability. Thus, the creation of highly accurate maps based on analysis of images, determining correspondence between images, and/or identification of ground control points within images presents a technical problem. Various embodiments of the present disclosure provide technical solutions to this technical problem by providing an improved user interface that enables the performance of image alignment and correspondence tasks.

Technical advantages of the present disclosure may be seen in FIGS. 12 and 13. First, FIG. 12 provides an example IUI 1200 of a labeling tool as described herein in the present disclosure. The IUI 1200 displays an indicator layer overlay 1208 in a left portion (e.g., second portion 150) and a perspective image 1210 in a right portion (e.g., first portion 100). The indicator layer overlay 1208 may be provided based on the methods, apparatuses, and computer program products described in the present disclosure. By incorporating the indicator layer overlay 1208, the IUI 1200 is thereby improved by dramatically assisting a user, for example in a GCP identification/labeling task. In other words, FIG. 12 illustrates an improved interactive user interface 1200 that adds to and enriches a user's experience of the labeling tool. For example, the improved interactive user interface 1200 is configured to enable the user to provide a more accurate labeling of a GCP within the perspective image and thereby enable and/or cause a more accurate digital map to be generated based thereon. Specifically, the information provided by the improved IUI 1200 enables the user to more accurately identify and label pixels of a perspective image that correspond to the GCP.

In a GCP identification/labeling task for example, the user may be presented with a perspective image 1210 and tasked with identifying a specific GCP. Without further context, the GCP is particularly challenging to find and label due to the complicated nature of the scene, which involves elevated train tracks and a four-way intersection comprising of multiple crosswalks, lane lines and limit lines. There are many landmarks in the area that look similar, increasing the likelihood of a user mistakenly mixing up a GCP location with a similar looking paint feature. Additionally with the perspective image 1210 being captured at a street-level or ground level by a probe apparatus 20 attached to the vehicle 6, an understanding of cardinality and an understanding of the surrounding environment may be lacking.

However, further context is provided by means of the indicator layer overlay 1208, described in the present disclosure. The indicator layer overlay 1208 comprises a first field-of-view/image indicator 1202 (although previously described separately, now grouped to ease explanation) associated with the perspective image 1210. Specifically, the first indicator 1202 has an indicator position at the image position where the perspective image 1210 was captured, and has the pose of the perspective image 1210. The first indicator 1202 comprises two lines and an arc and indicates to a user the approximate field-of-view of the perspective image 1210, that is, what may be visible within the perspective image 1210. The first indicator 1202 is also identified by a "1" to indicate that it corresponds to the first perspective image 1210.

The indicator layer overlay 1208 further comprises other image indicators 1204. The perspective image 1210 is shown to be the first image out of 32 perspective images, and the indicator layer overlay 1208 defines nine other image indicators 1204, accordingly identified with numbers 2-10, along with the first indicator 1202 to indicate to a user the image positions associated with ten perspective images. In another embodiment, 32 image indicators may be generated instead.

The indicator layer overlay 1208 additionally comprises a GCP indicator 1206, here identified by an "R". The GCP indicator 1206 dramatically assists the user in its task by illustrating the relative position of the ground control point to the image position, or the image point of view. Moreover, it may be seen in the indicator layer overlay 1208 that the ground control point may be located in the middle-right portion of the perspective image 1210, due to the field-of-view indicator 1202 indicating the approximate field-of-view. Thus, a user may then turn to the first portion 100 of the IUI where the perspective image 1210 is being displayed and search within the middle-right portion to identify and label pixels of the perspective image 1210 that correspond to the GCP (a pixel of the perspective image 1210 where the GCP is shown). Additionally, it may be further inferred that the ground control point may be located relatively far from the image position and therefore may be relatively small or obscured. In various example embodiments, the indicator layer overlay 1208 may include a scale bar, thereby allowing a user to exactly or approximately determine the distance between the GCP location and the image position so indicated by the indicator 1202.

The indicator layer overlay 1208 further benefits the user by being displayed overlaid on a digital map layer. For example, the indicator layer overlay 1208 demonstrates an indicator layer being overlaid a satellite layer, as seen by the satellite imagery of the surroundings. As shown, the satellite layer may be an ortho-rectified satellite image in order to provide an accurate overhead view. A number of green trees, the surrounding road network and topology, and various buildings are clearly displayed. With such imagery present in the indicator layer overlay 1208, the user may make further inferences such as the GCP being a corner of building or located near a corner of a building, as appropriate for the scenario.

The IUI 1200 of the labeling tool also illustrates user controls towards the bottom (e.g., in a third portion 180 of the IUI 1200) allowing the user to change the perspective image being displayed. In an example embodiment, a change of the perspective image being displayed may also change the field-of-view indicator to indicate the image pose of a new perspective image. For example, a user may interact with (e.g., via input circuitry of the user interface 18) a selectable display element 182 to prompt display of a second perspective image in the first portion 150 of the IUI 1200, further causing display of a field-of-view indicator located at the indicator position of the image indicator 1204 identified by a "2" (and optionally halting display of the first field-of-view indicator 1202). As understood from this description and FIG. 12, the indicator layer overlay 1208 and the user interface 1200 clearly provide an improvement of the user's experience of the IUI 1200 of the labeling tool leading to an improvement in a user's ability to perform a labeling task. For example, the user may be able to more accurately label the GCP within the perspective image which will lead to a more accurate digital map.

FIG. 13 provides another example IUI 1300 of a labeling tool as described herein in the present disclosure. The example IUI 1300 provides a distinct improvement to a user's ability to perform feature correspondence and image alignment tasks. Specifically, the IUI 1300 enables the user to more accurately identify and label pixels in two perspective images that correspond to the same static feature. The IUI 1300 comprises an indicator layer overlay 1302. The indicator layer overlay 1302, in the second portion 150 of the IUI, comprises two field-of-view indicators 1306A, 1306B, each representing an approximate field-of-view of perspective images 1304A and 1304B, respectively and also displayed in the IUI 1300, specifically a first portion 100 of the IUI 1300). In this example IUI 1300, the first portion 100 occupies a majority of the visible area of the IUI 1300 as compared to the second portion 150. This is in contrast to the example IUI 1200 in FIG. 12, where the first portion 100 and the second portion 150 are equal halves of the IUI 1200. In various example embodiments, the relative sizes of the first portion 100 and the second portion 150 may be controlled based on user interaction (e.g., via a user interface 18).

As discussed in the present disclosure, the first field-of-view indicator 1306A is defined to have a first image position and a first image pose of the first perspective image 1304A. FIG. 13 informs a user that the first perspective image 1304A was captured by a probe apparatus 20 attached to a vehicle 6 located at the image position indicated by indicator 1306A and having the image pose also indicated by indicator 1306A. Likewise, the second field-of-view indicator 1306B is defined to have a second image position and a second image pose of the second perspective image 1304B.

The indicator layer overlay 1302 assists a user orient themself in the surrounding environment captured by the two perspective images 1304A, 1304B. The indicator layer overlay 1302 further informs a user as to any overlap between the approximate fields-of-view of the two perspective images, thus achieving a key understanding required in an image alignment and correspondence task. For example, the first and second field-of-view indicators 1306A, 1306B appear to overlap, thereby suggesting that features may be visible in both perspective images 1304A, 1304B. In various example embodiments, the IUI 1300 may also generate an alert directing a user's attention to any overlap between the two field-of-view indicators.

Based on the positions and the poses of the two field-of-view indicators 1306A, 1306B, a user may quickly determine that objects positioned in a right portion of the first perspective image 1304A may be plainly visible in the second perspective image 1306B. Additionally, the point of view from which the first perspective image 1304A was captured may be visible in a right portion of the second perspective image 1304B. Thus, the user may quickly understand that the light-colored building on the right of the first perspective image 1304A is the same building largely prominent in the second perspective image 1304B. Furthermore, the user may quickly identify a blue and white striped pole 1308 clearly visible in the second perspective image 1304B as also being present in the first perspective image 1304A, albeit partially obscured by a pedestrian. This allows the user to then identify and label the pixels of the first perspective image 1304A that correspond to the blue and white striped pole 1308 and the pixels of the second perspective image 1304B that also correspond to the same blue and white striped pole 1308. Indeed, this illustrates one difficulty in performing labeling and feature correspondence and image alignment tasks. Perspective images often include transient features (e.g., vehicles, pedestrians) that may obscure various static features within the environment. The understanding of the environment provided to the user by the indicator layer described herein enables the user to more accurately perform labeling and feature correspondence and image alignment tasks despite the presence of transient features within the perspective images. Thus, it is shown and understood that with the assistance of the IUI 1300, the user is greatly assisted in identifying key features necessary for image alignment and correspondence. Various embodiments of the present disclosure therefore provide a technical solution to the field of highly accurate digital map generation and an improved interactive user interface that improves user experience thereof.

The user apparatus 10 and/or probe apparatus 20 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global positioning system (GPS), a cellular telephone, a mobile phone, a personal digital assistant (PDA), a watch, a camera, a computer, server, server system, a personal computer, a computer workstation, a laptop computer, a plurality of networked computing devices or the like, that are configured to provide an indicator layer overlay. In this regard, FIG. 2A depicts a user apparatus 10 of an example embodiment that may be embodied by various computing devices including those identified above. As shown, the user apparatus 10 of an example embodiment may include, may be associated with or may otherwise be in communication with a processor 12 and a memory device 14 and optionally a communication interface 16 and/or a user interface 18.

In some embodiments, the processor 12 (and/or co-processors or any other processing circuitry assisting or otherwise associated with the processor) may be in communication with the memory device 14 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

As described above, the user apparatus 10 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. For example, the processor 12 may be configured to provide and cause display of an indicator layer overlay and/or a user interface of a labeling tool. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

In some embodiments, the user apparatus 10 may include a user interface 18 that may, in turn, be in communication with the processor 12 to provide output to the user, such as a labeling tool user interface and/or an indicator layer overlay, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, and/or the like).

The user apparatus 10 may optionally include a communication interface 16. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the user apparatus 10 and/or probe apparatus 20 of an example embodiment, a navigation system may also include or have access to a geographic database that includes a variety of data (e.g., map information/data) utilized in constructing a route or navigation path, determining the time to traverse the route or navigation path, and/or other navigation functions. In an example embodiment, the geographic database may map information/data of a three-dimensional and/or 2.5-dimensional map in the form of three-dimensional and/or 2.5-dimensional model layers. In an example embodiment, the geographic database may further comprise a satellite layer. For example, a geographic database may include node data records (e.g., including anchor node data records comprising junction identifiers), road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In an example embodiment, the data records (e.g., node data records, link data records, POI data records, and/or other data records) may comprise computer-executable instructions, a reference to a function repository that comprises computer-executable instructions, one or more coefficients and/or parameters to be used in accordance with an algorithm for performing the analysis, one or more response criteria for providing a response indicating a result of the analysis, and/or the like. In an example embodiment, the user apparatus 10 may be configured to modify, update, and/or the like one or more data records and/or digital map layers of the geographic database.

In an example embodiment, the road segment data records are links or segments, e.g., maneuvers of a maneuver graph, representing roads, streets, or paths, as can be used in the calculated route or recorded route information for determination of one or more personalized routes. For example, the road segment data records may record route information of a vehicle 6 that travels through an area of interest while a probe apparatus 20 captures perspective images. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. Additionally, the geographic database can include data about GCPs. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). Similarly, place or feature data can be incorporated into GCP information/data or can be identified as GCPs.

In an example embodiment, static feature information/data is stored in association with the map information/data. For example, the geographic database may further comprise a database, library, and/or the like of static feature information/data that is stored in association with the map information/data. For example, in some embodiments, static feature information/data corresponding to static features located within a particular map tile is stored as part of (e.g., as a layer, associated map information/data, and/or the like) of the particular map tile. In an example embodiment, the static feature information/data is three-dimensional information/data. For example, the static feature information/data comprises information/data respectively describing one or more features (e.g., size, shape, color, texture, reflectance, and/or the like of the feature) and the position and orientation of the respective features. In an example embodiment, the static feature information/data is part of the three-dimensional model of the geographic area. In an example embodiment, at least a portion of the static feature information/data is used as GCP information for defining GCP indicators in an indicator layer overlay.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be updated based on information/data provided by one or more mobile apparatuses.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a user apparatus 10 in accordance with an example embodiment may determine the time to traverse a route that includes one or more turns at respective intersections more accurately.

As described above, FIGS. 8, 9A, 9B, 10, and 11 illustrate flowcharts of user apparatuses 10, method, and computer program product according to an example embodiment of the disclosure. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14 of an apparatus employing an embodiment of the present disclosure and executed by the processor 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the disclosure set forth herein will come to mind to one skilled in the art to which the disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving, by a processor of a user apparatus, metadata associated with a perspective image captured by an image capture device located at an image position and having an image pose, wherein the metadata comprises the image position and the image pose;
   defining, by the user apparatus, a field-of-view indicator having a first indicator position located at the image position and having the image pose, wherein the field-of-view-indicator (a) is an interactive user interface (IUI) display element and (b) is configured to represent the field-of-view of the perspective image;
   receiving, by the processor of the user apparatus, ground control point (GCP) information identifying a GCP, wherein the GCP information comprises a GCP position based at least in part on a location of the GCP and wherein a GCP is a feature associated with a ground truth position;
   defining, by the user apparatus, a GCP indicator having a second indicator position located at the GCP position, wherein the GCP indicator (a) is another IUI display element and (b) is configured to represent a location of the GCP;
   generating, by the user apparatus, an indicator layer comprising the field-of-view indicator and the GCP indicator, the indicator layer configured to be rendered and displayed via output circuitry; and
   causing, by the user apparatus, display of the indicator layer comprising the field-of-view indicator and the GCP indicator in a second portion of an IUI of a labeling tool, wherein at least the perspective image is displayed in a first portion of the IUI of the labeling tool and the labeling tool is provided via output circuitry of the user apparatus.

2. The method of claim 1, wherein the indicator layer comprising the field-of-view indicator and the GCP indicator is displayed overlaid on a digital map layer in the second portion of the IUI of the labeling tool, the digital map layer being one of a satellite layer, a two-dimensional model layer, or a three-dimensional model layer.

3. The method of claim 1, wherein the field-of-view indicator comprises a configurable representation of an approximate field-of-view of the image capture device when the perspective image was captured.

4. The method of claim 3, wherein the field-of-view indicator comprises two lines extending from the first indicator position, the two lines defining a field-of-view angle that is oriented based at least in part on the image pose, the field-of-view angle representing the approximate field-of-view.

5. The method of claim 3, further comprising providing an alert via the IUI of the labeling tool based at least in part on the GCP indicator being located within the approximate field-of-view.

6. The method of claim 1, wherein the image position and the image pose are determined at least in part by a location sensor of a probe apparatus, the image capture device being coupled to the probe apparatus.

7. The method of claim 6, wherein the image position comprises a latitude, longitude, and elevation of the probe apparatus, and the image pose comprises an orientation of the probe apparatus.

8. The method of claim 1, further comprising:
   receiving, by the processor of the user apparatus, metadata associated with a second perspective image, wherein the metadata associated with the second perspective image comprises a second image position and a second image pose;
   defining, by the user apparatus, a second image indicator having a third indicator position located at the second image position; and
   causing display of the second image indicator in the second portion of the IUI of the labeling tool.

9. The method of claim 8, further comprising:
   defining, by the user apparatus, a second field-of-view indicator having the third indicator position located at the second image position and having the second image pose;
   defining, by the user apparatus, a first image indicator having the first indicator position located at the image position; and
   responsive to user interaction with input circuitry of the user apparatus, causing display of a second indicator layer comprising the second field-of-view indicator, the first image indicator, and the GCP indicator via the second portion of the IUI of the labeling tool.

10. The method of claim 1, wherein the GCP is an identifiable, static feature located within a predetermined distance from the image position.

11. The method of claim 10, wherein the GCP is at least partially visible in the perspective image.

12. The method of claim 1, wherein the GCP position is a ground truth position.

13. The method of claim 1, wherein the GCP information further comprises a plurality of control images, the GCP being visible in each of the plurality of control images.

14. The method of claim 13, further comprising causing display of the plurality of control images in the first portion of the IUI of the labeling tool.

15. An apparatus comprising at least one processor and at least one memory storing computer program code, the at least one memory and the computer program code are configured to, with the processor, cause the apparatus to at least:
receive metadata associated with a perspective image captured by an image capture device located at the image position and having the image pose, wherein the metadata comprises the image position and the image pose;
define a field-of-view indicator having a first indicator position located at the image position and having the image pose, wherein the field-of-view-indicator (a) is an interactive user interface (IUI) display element and (b) is configured to represent the field-of-view of the perspective image;
receive ground control point (GCP) information identifying a GCP, wherein the GCP information comprises a GCP position based at least in part on a location of the GCP and wherein a GCP is a feature associated with a ground truth position;
define a GCP indicator having a second indicator position located at the GCP position, wherein the GCP indicator (a) is another IUI display element and (b) is configured to represent a location of the GCP;
generate an indicator layer comprising the field-of-view indicator and the GCP indicator, the indicator layer configured to be rendered and displayed via output circuitry; and
cause display of the indicator layer comprising the field-of-view indicator and the GCP indicator in a second portion of an IUI of a labeling tool, wherein at least the perspective image is displayed in a first portion of the IUI of the labeling tool and the labeling tool is provided via output circuitry.

16. The apparatus of claim 15, wherein the indicator layer comprising the field-of-view indicator and the GCP indicator is displayed overlaid on a digital map layer in the second portion of the IUI of the labeling tool, the digital map layer being one of a satellite layer, a two-dimensional model layer, or a three-dimensional model layer.

17. The apparatus of claim 15, wherein the field-of-view indicator comprises a configurable representation of an approximate field-of-view of the image capture device when the perspective image was captured.

18. The apparatus of claim 15, further caused to at least:
receive metadata associated with a second perspective image, wherein the metadata associated with the second perspective image comprises a second image position and a second image pose; and
define a second image indicator having a third indicator position located at the second image position; and
cause display of the second image indicator in the second portion of the IUI of the labeling tool.

19. The apparatus of claim 18, further caused to at least:
define a second field-of-view indicator having the third indicator position located at the second image position and having the second image pose;
define a first image indicator having the first indicator position located at the image position; and
cause display of a second indicator layer comprising the second field-of-view indicator, the first image indicator, and the GCP indicator via the second portion of the IUI of the labeling tool.

20. The apparatus of claim 15, wherein the GCP is an identifiable, static feature located within a predetermined distance from the image position.

* * * * *